United States Patent [19]
Nakanishi et al.

[11] Patent Number: 5,805,196
[45] Date of Patent: Sep. 8, 1998

[54] APPARATUS FOR RECORDING A COLOR IMAGE ON A COLOR PHOTOGAPHIC MATERIAL BASED ON THREE COLOR COMPONENT IMAGE SIGNALS SEPARATED FROM THE COLOR IMAGE

[75] Inventors: Kenzo Nakanishi; Hiroaki Arakawa; Minoru Yasuda; Toyoaki Sugaya, all of Hachioji, Japan

[73] Assignee: Konica Corporation, Tokyo, Japan

[21] Appl. No.: 522,741

[22] Filed: Sep. 1, 1995

[30] Foreign Application Priority Data

| Sep. 9, 1994 | [JP] | Japan | 6-215694 |
| Oct. 31, 1994 | [JP] | Japan | 6-267500 |
| Nov. 18, 1994 | [JP] | Japan | 6-284876 |
| Jan. 24, 1995 | [JP] | Japan | 7-008998 |

[51] Int. Cl.[6] .......................................................... B41J 2/47
[52] U.S. Cl. ............................................. 347/230; 347/232
[58] Field of Search .................................. 347/232, 236, 347/230, 240, 251, 115

[56] References Cited

U.S. PATENT DOCUMENTS 4,764,807  8/1988  Kimura et al. ........................... 347/232
5,057,913  10/1991 Nagata et al. ............................ 347/232

FOREIGN PATENT DOCUMENTS 63-279238  11/1988  Japan ............................. G03B 27/32
64-35538   2/1989   Japan ............................. G03B 27/32
5-21474    3/1993   Japan ............................. H04N 9/79

Primary Examiner—Mark J. Reinhart
Attorney, Agent, or Firm—Frishauf, Holtz, Goodman, Langer & Chick

[57] ABSTRACT

An image recording apparatus of the present invention comprises: an image processing means for compensating the color and gradation of an inputted color image; a monochromatic CRT; a display means for successively inputting color images, having a plurality of colors, into the monochromatic CRT, and for displaying a plurality of images on the monochromatic CRT as monochromatic images; an optical system for forming the monochromatic image, displayed on the monochromatic CRT, onto a color photographic paper; a plurality of color filters, which are selectively inserted between the monochromatic CRT and the color photographic paper, and convert the monochromatic image into a plurality of monochromatic color images; an exposure luminance setting means for each separation color; and an emitting luminance control means.

13 Claims, 22 Drawing Sheets

APPARATUS FOR RECORDING A COLOR IMAGE ON A COLOR PHOTOGAPHIC MATERIAL BASED ON THREE COLOR COMPONENT IMAGE SIGNALS SEPARATED FROM THE COLOR IMAGE

BACKGROUND OF THE INVENTION

The present invention relates to a monochromatic CRT for an image recording apparatus and an image recording apparatus. More particularly, the present invention relates to an image recording apparatus in which a color image is printed on a color photographic paper by a monochromatic CRT and a color filter. Further, in more detail, the present invention relates to an image recording apparatus (image printing apparatus) in which grainy luminance (minute fluctuation), color balance, luminance, and uniformity of the monochromatic CRT are improved in order to realize printing an image of high quality.

Conventionally, a monochromatic CRT is widely used for ① an image recording apparatus. As fluorescent substances used for the monochromatic CRT, so-called P45 and P22 are popularly used. In some cases, these fluorescent substances are mixed with each other, and the mixture is coated onto the CRT. For example, a fluorescent substance having the following compounding ratio is disclosed in Japanese Patent Publication No. 21474/1993, P45:P22=1:3 through 1:5. Further, a spin coating method, a natural sedimentation method, or the like, is used as a method for coating the fluorescent substance onto the CRT.

Further, as ② an image recording apparatus, an apparatus using the monochromatic CRT, and color filters of blue, green and red, are widely known. In this apparatus, monochromatic images in which each image is expressed by lightness, are successively displayed on the monochromatic CRT. Simultaneously, blue, green, and red filters corresponding to each color, are successively inserted into this system, and the monochromatic image is converted into a blue, a green and a red image. The blue, green and red images converted by the monochromatic CRT and color filters, are sequentially exposed onto a color photographic paper.

However, in the monochromatic CRT used for ① the image recording apparatus, it has been recognized that generally, the graininess of the luminance on the fluorescent surface of the CRT is large.

Since a monochromatic CRT, in which excessive graininess of the luminance tends to occur, is used in ② a conventional apparatus, the graininess of the image is generated when an image is printed.

The present invention is offered to solve at least one of the above problems. The first object of the present invention is to provide a CRT for an image recording apparatus, in which the graininess of the luminance is reduced, and further, to provide an image recording apparatus in which the graininess of the luminance is reduced.

Conventionally, an exposure apparatus, using a light source and exposure color filters for three colors (blue, green and red), in order to reproduce color images, recorded on a magnetic disk, that is, a floppy video disk, or an image signal recording medium such as a video tape, or the like, as high quality hard copies, is obvious to skilled persons. In FIG. 23, a light beam emitted from a white light source 200 passes through a color transmission-type document 201, and an optical image is formed. When exposure filters 202 for each color are successively inserted into this optical path, the optical image is color-separated and converted into each monochromatic image. Then, exposure control for each monochromatic image, that is, a blue image, a green image, and a red image, is successively carried out with respect to a recording medium such as color photographic paper 205, or the like, by opening and closing a shutter 203 through a lens 204. Further, in FIG. 24, a disk 211, on which exposure color filters for each color are provided, is located in the optical path of the optical image displayed on an optical image display means such as a CRT 210, and the disk is rotated so that the rotational position of the disk is appropriately adjusted in accordance with the exposure conditions. Thereby, the optical image is converted into monochromatic color images, and exposure control for the image is carried out.

Further, the following technology is disclosed in Japanese Patent Publication Open to Public Inspection No. 279238/1988, in which: a disk, on which exposure filters 202 are provided, is rotated in accordance with the exposure conditions; and thereby, each color is subjected to additive color exposure, and the light successively passes through the color transmission-type document and exposure is carried out.

When a quantity of light or spectral characteristics of the white light source 200 or the CRT 210 are measured, photometry of the light source or the CRT is carried out by a photometric sensor 206 through exposure color filters 202 for each color.

Generally, as shown in FIG. 6, in color photographic papers used for the exposure apparatus, exposure sensitivity is quite different for each color. Accordingly, an image having a desired color balance is recorded when exposure time for each color is set to be quite different from each other, or when the compounding ratio of a plurality of fluorescent substances in a monochromatic CRT is set such that the light emitting luminance in a wavelength range having the lower sensitivity in the color photographic paper, becomes larger.

However, when the exposure time is quite different for each color as described above, the control range of the exposure time is broader, and the exposure control becomes more complicated, and efficient image recording can not be carried out, which cause problems. On the other hand, in cases where a compounding ratio of the fluorescent substance in the monochromatic CRT is adjusted, when compounding ratios of a plurality of fluorescent substances are quite different from each other, flocculation of fluorescent substances occurs, and there is a possibility that the quality of images recorded on the photographic paper is deteriorated.

Further, when changes of ambient temperature or changes of the color balance (the spectral luminance distribution) due to deterioration over time occur, even if the exposure time or the compounding ratio of the fluorescent substance is appropriately set in accordance with the spectral sensitivity of the color photographic papers as described above, the color balance of images recorded on the color photographic papers is sometimes deteriorated.

That is, normally, the fluorescent screen of a monochromatic CRT is formed by mixing a plurality of different kinds of fluorescent substances, and the degree of deterioration due to temperature changes or changes over time, is different for each fluorescent substance. Accordingly, the fluorescent screen shows characteristics different from the initial spectral luminance distribution color, and this change in the luminance distribution appears as a change of the exposure energy in a specific wavelength area, and the color balance is sometimes lost.

The present invention is considered in view of the foregoing problems. The second object of the present invention is to record an image with a desired color balance by an apparatus in which: the exposure time for each color can be set similar to each other, even if there is a large difference between exposure sensitivities of each color in color photographic papers; and compounding ratios of fluorescent substances, having an inclination to flocculate the fluorescent substances in a monochromatic CRT, are not required.

Further, even when changes of color balance (the spectral luminance distribution) due to environmental conditions or changes over time on the display screen of a monochromatic CRT occur, desired image recording can be performed in the apparatus of the present invention.

When a CRT is used as an image display apparatus as shown in FIG. 24, the dispersion of luminance, which is called shading, occurs both horizontally and vertically on the display screen. This luminance dispersion is largely changed depending on changes over time or changes of temperature of the CRT, and accordingly, shading compensation is periodically carried out. This compensation is carried out by the following method: a luminance sensor is provided at a portion separated from the image area, located between the CRT and the recording medium, to measure the image luminance directly; or the optical path of the displayed image on the CRT is changed and the luminance is indirectly measured, as disclosed in Japanese Patent Publication Open to Public Inspection No. 35538/1989; and thereby, changes of the luminance are detected; and the luminance signal is fed back to the CRT, so that the luminance is compensated for to be a predetermined value.

As such exposure apparatus are more frequently used recently, reduction of the price and the over-all size of the apparatus are being required more and more, it is however difficult to realize these requirements because such a structure is quite complicated. Further, concerning the shading compensation, when a luminance sensor is provided at a portion outside the image area of the CRT, the measured luminance is different from the actual exposure luminance, so that the actual exposure luminance is not actually measured. On the other hand, in a system in which the luminance of the displayed image on a CRT is measured with a mirror, although accuracy in the measurement can be obtained, the structure becomes more complicated.

In view of the foregoing problems, the third object of the present invention is to perform the shading compensation by a simpler structure, and to secure accuracy of the image compensation.

Although decreasing the price and reducing the over-all size of the apparatus are required as such exposure apparatus are more frequently used recently, it is difficult to realize these requirements because such a structure is quite complicated. For example, in the case where the quantity of light or spectral characteristics of a light source or an optical image display means are measured as described above, a shutter 203 mechanism to inhibit exposure onto a recording medium is required, because the exposure onto the recording medium in photometry is not required, as shown in FIG. 24.

The present invention is investigated in view of the foregoing problems. The fourth object of the present invention is to provide an exposure apparatus in which the structure is simplified, and reduction of cost and size can also be realized.

SUMMARY OF THE INVENTION

The first object is attained by the following means.

(1) A monochromatic CRT for use in an image recording apparatus comprises: an image processing means for compensating the color and gradation of an inputted color image; a monochromatic CRT; a display means for successively inputting images, having a plurality of colors, of the color image into the monochromatic CRT, and for displaying a plurality of images on the monochromatic CRT as monochromatic images; an optical system for forming the monochromatic image, displayed on the monochromatic CRT, onto a color photographic paper; and a plurality of color filters, which are selectively inserted between the monochromatic CRT and the color photographic paper, and convert the monochromatic image into a plurality of monochromatic color images. Further, the monochromatic CRT for an image recording apparatus satisfies the following relational expression; compounding ratio of the fluorescent substances P45 and P22 coated on the monochromatic CRT, $$0.67 < P45/P22 < 1.5$$

(2) The image recording apparatus comprises: an input means for inputting a color image; an image processing means for compensating the color and gradation of the inputted color image; a monochromatic CRT having a compounding ratio of fluorescent substances P45 and P22, which satisfies the relational expression, $0.67 < P45/P22 < 1.5$; a display means for successively inputting images, having a plurality of colors, of the color image into the monochromatic CRT, and for displaying a plurality of images on the monochromatic CRT as monochromatic images; an optical system for forming the monochromatic image, displayed on the monochromatic CRT, onto a color photographic paper; and a plurality of color filters, which are selectively inserted between the monochromatic CRT and the color photographic paper, and convert the monochromatic image into a plurality of monochromatic color images.

Here, 'graininess' means a condition in which a partial fluctuation of the density of the printed image, which is seen as a stripe, is generated on the printed image and the image is also grainy when printed. 'The fluorescent substance P45' means the substance which is called P45 in the EIA name, and which is a fluorescent substance, made of material having components of $Y_2O_2S$:Tb. This fluorescent substance has the spectral luminance characteristics shown in FIG. 4, and the emitting luminance is largely reduced in the red wavelength region.

'The fluorescent substance P22' means the substance which is called P22 in the EIA name, and which is made of fluorescent substance having the components of $Y_2O_2S$:Eu. This fluorescent substance has, for example, the spectral luminance characteristics shown in FIG. 5.

As a result of the study for the graininess of the luminance of the fluorescent substance, it has been recognized that flocculation between fluorescent substances occurs, and then, the stripe-like graininess occurs when the compounding ratio is not appropriate in the case where different fluorescent substances are mixed with each other. Further, it has been recognized that the same kind of fluorescent substances adhere to each other and flocculation occurs when the compounding ratio of the representative fluorescent substances P45 and P22 is deflected to one side. Further, it has been recognized that a print in which the graininess of density is largely reduced, is obtained when the compounding ratio of P45 and P22 is appropriate.

The above-described relational expression of the compounding ratio of the fluorescent substances for use in the monochromatic CRT of the present invention, will be explained below. When the compounding ratio exceeds the upper limit of the relational expression, or the compounding ratio is lower than the lower limit, the same kind of fluorescent substances are flocculated with each other, and particularly, the graininess of the luminance is conspicuous in the intermediate density, and a striped print occurs. In this connection, the following compounding ratio is preferable, 1<P45/P22<1.3. When the compounding ratio is larger than the upper limit, or the compounding ratio is lower than the lower limit, the same disadvantage as described above, occurs.

In order to accomplish the second object, an image recording apparatus of the present invention is structured such that the apparatus records a color image by exposing an optical image, displayed on a monochromatic image display means, onto a sheet of color photographic paper successively for separation color through an exposure color filter, which is selectively inserted into the optical path. The image recording apparatus comprises: an exposure luminance setting means for setting the exposure luminance respectively for each separation color; and an emitting luminance control means for controlling the emitting luminance in the monochromatic image display means for each separation color in accordance with the exposure luminance which is set by the exposure luminance setting means.

It is preferable that the exposure luminance setting means sets the exposure luminance for each previously obtained separation color so that exposure time for each separation color is equal to each other, in accordance with at least the spectral sensitivity of the color photographic paper.

It is also preferable that the exposure luminance setting means includes: a luminance distribution detection means for detecting the luminance distribution for each separation color on the display screen of the monochromatic image display means; and a luminance compensation means for individually compensating the emitting luminance for each separation color, in accordance with the luminance distribution for each separation color detected by the luminance distribution detection means.

It is further preferable that the luminance distribution detection means detects the luminance distribution for each separation color under the condition that the monochromatic display means displays the entire white signal.

It is still further preferable that the luminance distribution detection means comprises photoelectric conversion elements, the number of which is equal to that of the separation colors, the photoelectric conversion elements being provided with color filters for each separation color.

It is further still preferable that the luminance distribution detection means detects the emitting luminance in the monochromatic image display means through the exposure color filters.

It is also preferable that the luminance distribution detection means detects the emitting luminance in a p redetermined area in the vicinity of the center of the display screen of the monochromatic image display means.

According to the image recording apparatus of the present invention, since the emitting luminance on the monochromatic image display means is controlled for each separation color, the exposure energy can be different for each color, without causing the exposure time to be largely different from each other, and further, without changing compounding ratios of fluorescent substances in the image display means.

When the exposure luminance is set in accordance with the spectral sensitivity of the color photographic paper, and the emitting luminance, during exposing a color area having the lower sensitivity, is set so as to be greater compared with that during exposing of the other colors, a well balanced color image recording can be performed without unduly changing the exposure time for each color.

Since the luminance distribution for each separation color on the display screen of the monochromatic image display means is detected, and the emitting luminance is compensated for each separation color according to the detected result, changes in the color balance are compensated for and a predetermined color image recording can be performed, for example, when the compensation, in which the emitting luminance in the image display means is enhanced, is carried out during the exposure for blue B in the case where separation colors of red R, green G, and blue B are used, and it is detected that a change occurred, in which a component of blue B is relatively weakened in the monochromatic screen.

The luminance distribution for each separation color can be accurately detected when the following condition, in which the entire white signal is displayed on the monochromatic image display means, is used as a reference.

The luminance distribution for each separation color on the display screen of the monochromatic image display means can be detected simultaneously and stably by photoelectric conversion elements provided respectively with the color filter for each separation color, the number of the photoelectric conversion elements being equal to that of the separation colors.

The luminance distribution for each separation color on the display screen of the monochromatic image display means can be detected by a simple structure using the color separation with the exposure color filter.

Since the luminance is detected in a partial area in the vicinity of the center of the screen in which the luminance is relatively stably generated even when a certain amount of disturbance occurs in the display, the luminance distribution can be detected quite accurately.

The third object of the present invention can be accomplished by an optical image recording apparatus in which an optical image, formed on a monochromatic optical image display means for each of the 3 separation colors, is color-separated into mono-color images by each selectively inserted color separation filter, and successively exposed and recorded onto a recording medium, the optical color image recording apparatus comprising: a light shielding filter which shields light between the monochromatic optical image display means and the recording medium, and on which a plurality of luminance sensors, for detecting the luminance of the light emitted from the optical image display means, are located two-dimensionally; an exposure control means for conducting exposure control when the light shielding filter is controlled such that it is inserted into or removed from the optical path of the optical image, or when the light emission is controlled on the monochromatic optical image display means; and a luminance compensation means for compensating for the horizontal and vertical dispersion of luminance of the optical image by feed-back in accordance with luminance signals inputted from the plurality of luminance sensors before color separation.

The exposure control means and the control means for inserting and removing each color separation filter may be structured such that these means are controlled by a common drive source.

Further, the image compensation means may be structured such that the dispersion of the luminance of a frame image is compensated for every time the frame image is exposed onto the recording medium.

Still further, the light shielding filter may be provided behind each color separation filter.

By the above-described structure, the luminance in the optical path of the displayed image can be directly detected by luminance sensors provided on the light shielding filter, and thereby, reduction of cost and size of the apparatus can be realized while the accuracy of image compensation is assured.

In this connection, in the apparatus in which the exposure control means and the control means for inserting and removing each color separation filter are controlled by a common drive source, a further reduction of cost and size can be realized by using a common drive source.

Further, in the apparatus in which the dispersion of the luminance of the frame image is compensated for by feed-back whenever the frame image is exposed onto the recording medium, a memory apparatus to store the image data for shading compensation is not necessary, and accordingly, an additional cost reduction can be realized.

Still further, in the apparatus in which a light shielding filter is provided behind each color separation filter, the luminance can be detected while each color separation filter is inserted, and accordingly, the color balance of the fluorescent substance of the optical image display means corresponding to each color is measured, and color compensation can be carried out.

The fourth object of the present invention can be accomplished by an exposure apparatus in which an optical image is color-separated by selectively inserted exposure color filters, the exposure apparatus comprising: a rotation member provided at positions different from each other around the rotational axis such that a light shielding portion, to shield the light on the optical path, and exposure color filters are selectively disposed in the optical path of the optical image between the optical image and the recording medium; an exposure control means for controlling the exposure by selectively disposing the light shielding portion and the exposure color filter in the optical path of the optical image by driving the rotation member; luminance sensors for measuring the luminance for each separation color of a light source for optical image generation through color filters for measurement, when the exposure control means controls the rotation member to shield the light; and an exposure condition compensation means for compensating the exposure conditions of the optical image by feed-back in accordance with the luminance signals sent from the luminance sensors.

In this connection, the apparatus may be structured such that the measurement color filters are provided on the rotation member, and disposed so that a light, emitted from the light source for optical image generation and passed through the color filters for measurement, is received by the luminance sensors in the area in which the rotation member is located at the light shielding position.

Further, the apparatus may be structured such that: the measurement color filters have spectral characteristics almost equal to those of the exposure color filters; and the measurement color filters are set to have transmission ratios in which the output values for each color from the luminance sensors are almost equal to each other.

Still further, the apparatus may be structured such that: the exposure color filters can also be used as measurement color filters; and photometry is carried out through the exposure color filters when the rotation member is located at the light shielding position.

Further, the apparatus may be structured such that the optical image is displayed on the optical image display means at each separated color's intensity level.

Further, the exposure condition compensation means may be structured such that: the luminance value is changed when a contrasting potential voltage or a brightness potential voltage of the optical image display means, on which the optical image is displayed, is controlled according to the luminance signal sent from the luminance sensors at the time of light shielding.

Still further, the optical image may be a transmission image of the color transmission document, which is obtained when white light passes through the document.

Due to the foregoing structure, the rotation member and the exposure control means, which are disposed around the rotation axis at positions different from each other such that the light shielding portion for shielding the optical path and the exposure color filters are selectively located, drive the rotation member and the exposure is controlled when the light shielding portion and the exposure filters are selectively located in the optical path of the optical image, and thereby, the photometry can be carried out while the light shielding for the recording medium of the optical image is carried out without the use of a shutter mechanism. Accordingly, the structure of the apparatus is simplified, and the cost and size of the apparatus can be reduced.

In this connection, the present invention can also be applied to an apparatus in which the measurement color filters are provided on the rotation member, and disposed so that a light beam, emitted from the light source for optical image generation and passed through the measurement color filters, is received by the luminance sensors in an area in which the rotation member is located at the light shielding position.

Further, in the apparatus in which: the measurement color filters have spectral characteristics almost equal to those of the exposure color filters; and the measurement color filters are set to have transmission ratios in which the output values for each color from the luminance sensors are almost equal to each other, the output levels of the luminance sensors for each color are also equal to each other. Accordingly, a structure such as a gain switching means, or the like, is not necessary, and the cost and size of the apparatus can be further reduced.

Still further, in the apparatus in which: the exposure color filters are used also as measurement color filters; and the photometry is carried out through the exposure color filters when the rotation member is located at the light shielding position, these filters can be used in common with each other, and thereby, a still lower cost apparatus can be provided.

Further, the present invention can also be applied to an apparatus in which: the optical image is displayed on the optical image display means at the intensity level for each separated color; or the optical image is a transmission image of the color transmission document, which is obtained when white light passes through the document.

Further, the exposure condition compensation means can also be applied to the exposure apparatus in which a contrast potential voltage or a brightness potential voltage of the optical image display means, on which the optical image is displayed, is controlled according to luminance signals sent from the luminance sensors at the time of light shielding.

DETAILED DESCRIPTION OF THE PREFERRED EMBODIMENT

Figure 1:
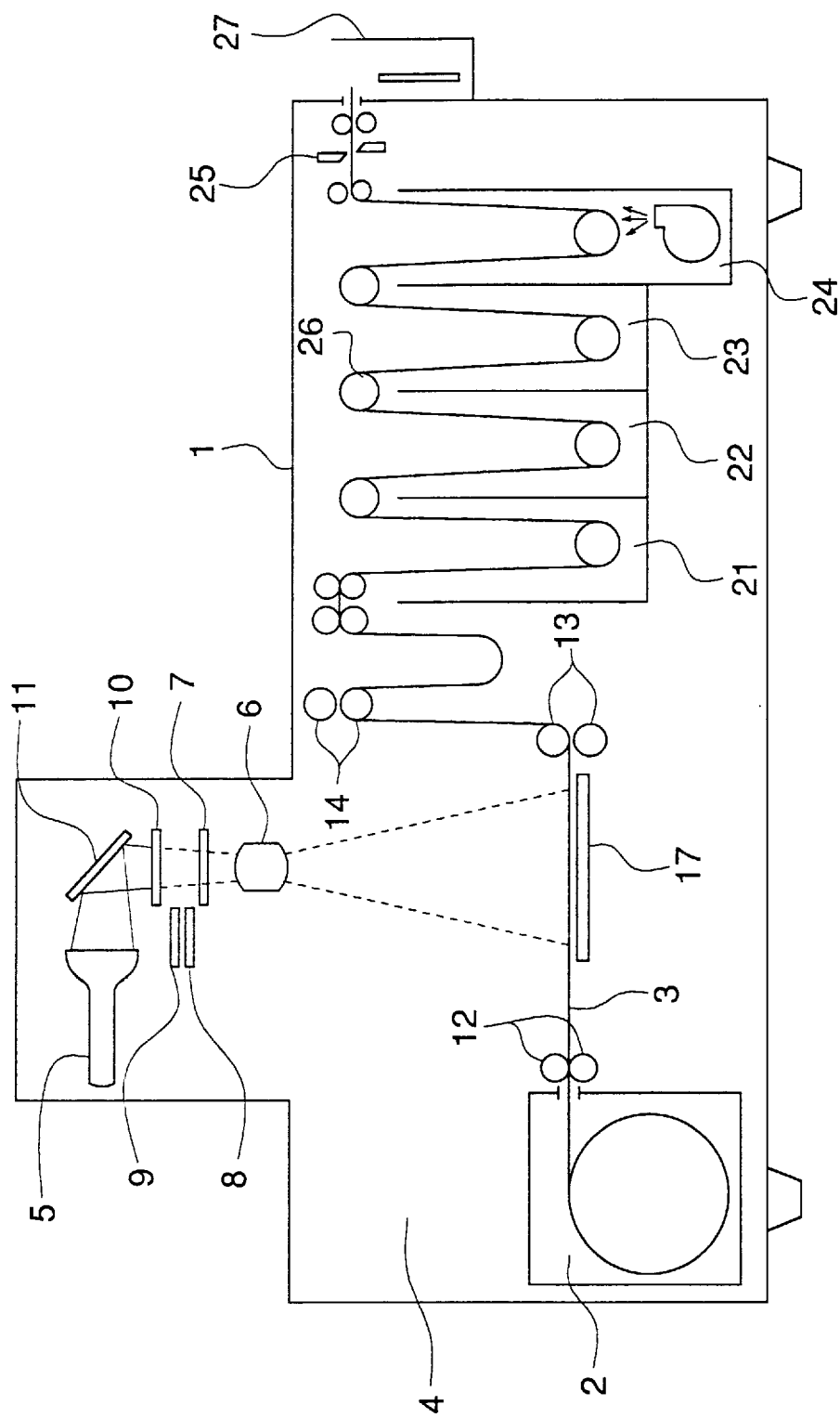
FIG. 1 is a schematic view of the structure of an image printing apparatus of an example of the present invention.

Referring to the drawings, an example of the present invention will be described below.

A monochromatic CRT for an image printing apparatus of an example of the present invention will be described in FIG. 3 through FIG. 5.

Figure 3:
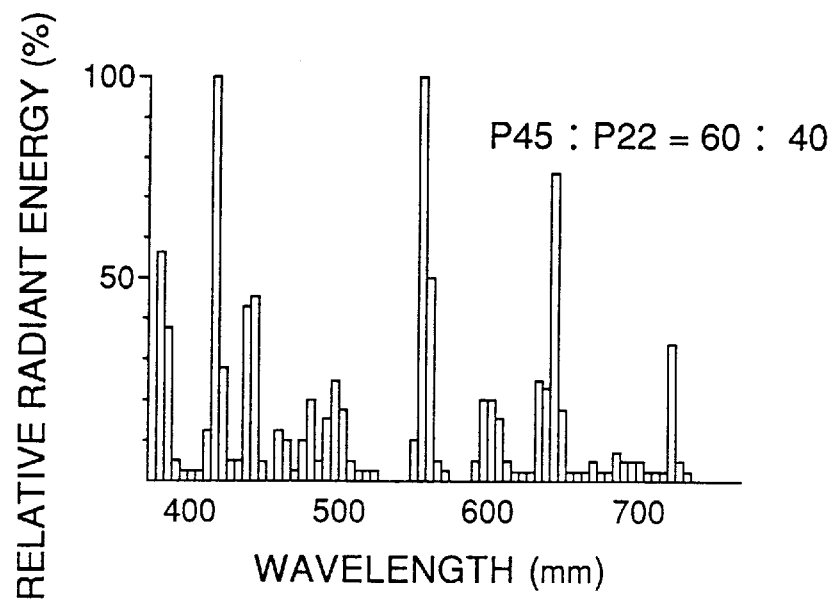
FIG. 3 is a graph showing spectral luminance characteristics of a monochromatic CRT of an example of the present invention.

FIG. 3 is a graph showing the spectral luminance characteristics of the monochromatic CRT of the example of the present invention. In this case, a CRT is used in which a compounding ratio of 1.5 (=P45/P22) of fluorescent substances P45 and P22 is set, and the mixture is naturally and uniformly precipitated from a solution onto the surface of the tube of the CRT. In the graph in FIG. 3, the horizontal axis shows a wavelength and the vertical axis shows the relative radiation energy.

Figure 4:
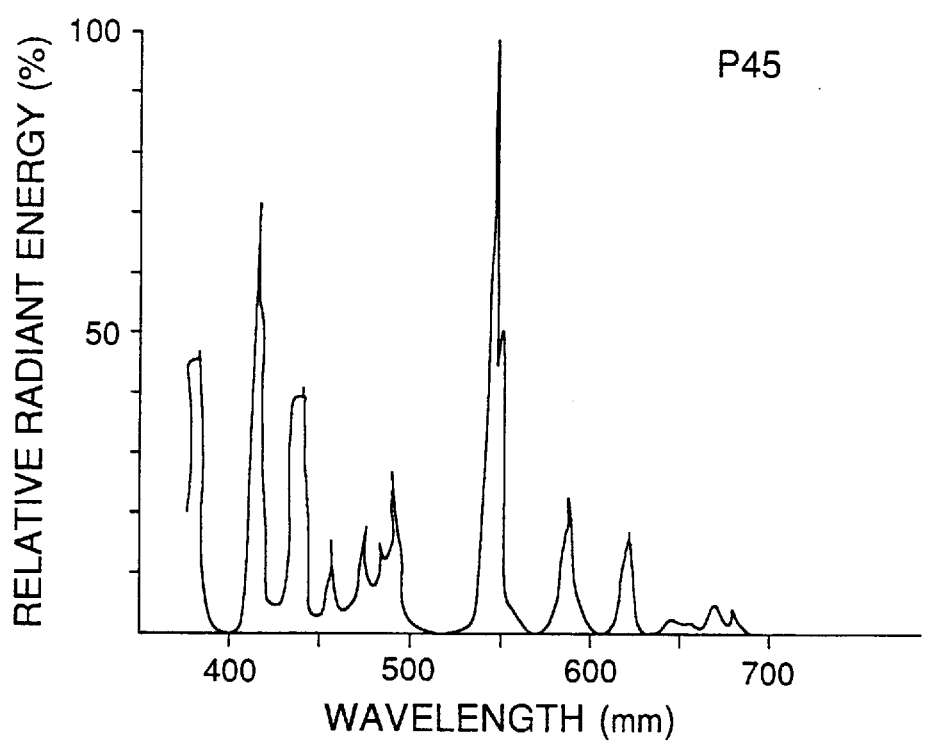
FIG. 4 is a graph showing spectral luminance characteristics of a fluorescent substance P45 used in the monochromatic CRT of the present invention.

FIG. 4 is a graph showing the spectral luminance characteristics of the fluorescent substance P45 used in the example of the monochromatic CRT of the present invention. This fluorescent substance is called P45 in the EIA name, and the fluorescent substance having the material component of $Y_2O_2S:Tb$ is used. This fluorescent substance has a maximum peak luminance at a wavelength of approximately 540 nm and has a luminance distribution in the short wavelength area lower than approximately 600 nm, and the light emission luminance is relatively low in the red wavelength area.

Figure 5:
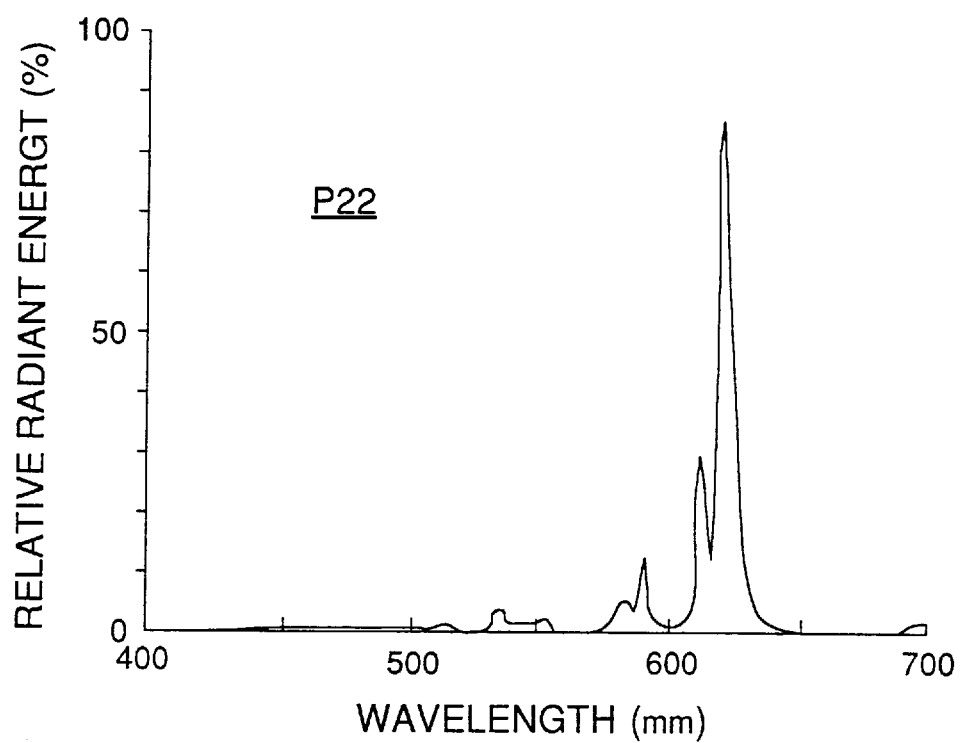
FIG. 5 is a graph showing spectral luminance characteristics of a fluorescent substance P45 used in the monochromatic CRT of the present invention.

FIG. 5 is a graph showing the spectral luminance characteristics of the fluorescent substance P22 used in the example of the monochromatic CRT of the present invention. This fluorescent substance is called P22 in the EIA name, and the fluorescent substance having the material component of $Y_2O_2S:Eu$ is used. This fluorescent substance has a maximum peak luminance at a wavelength of approximately 620 nm.

In this connection, the compounding ratio of the fluorescent substances P45 and P22 is not limited to 1.5 (=P45/P22), but it is understood that other variations and modifications may be made without departing from the spirit and scope of the invention.

(Comparative experiment)

Figure 7:
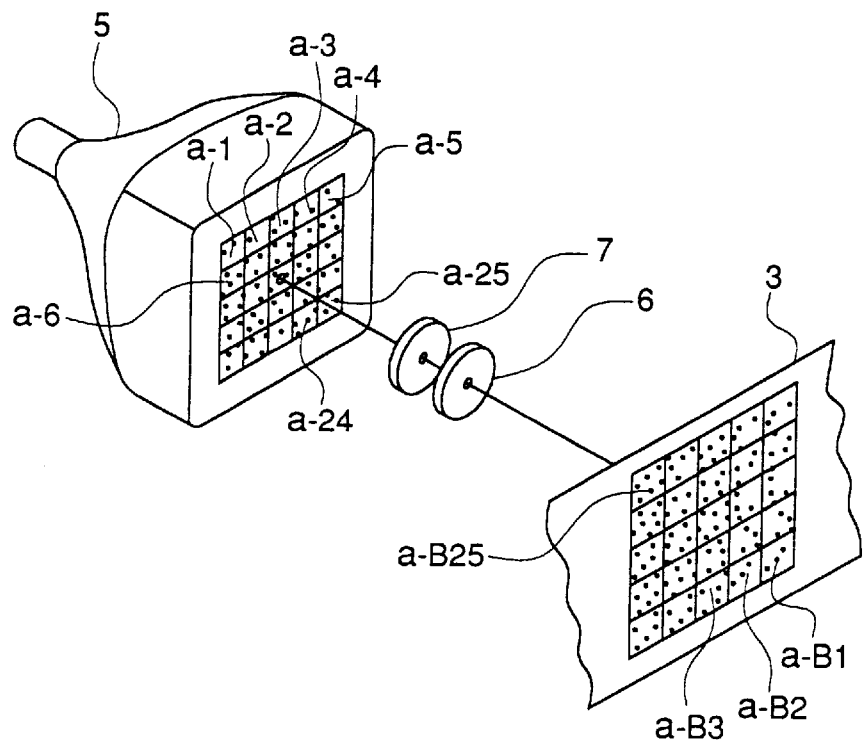
FIGS. 7(A) and 7(B) are a view and graph explaining the evaluation of a monochromatic CRT.
Figure 7:
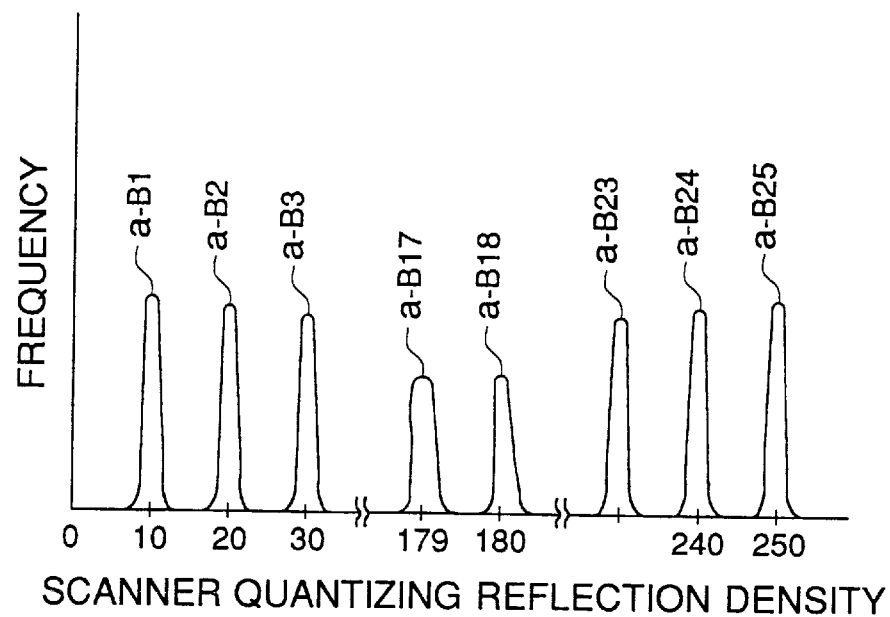
Figure 8:
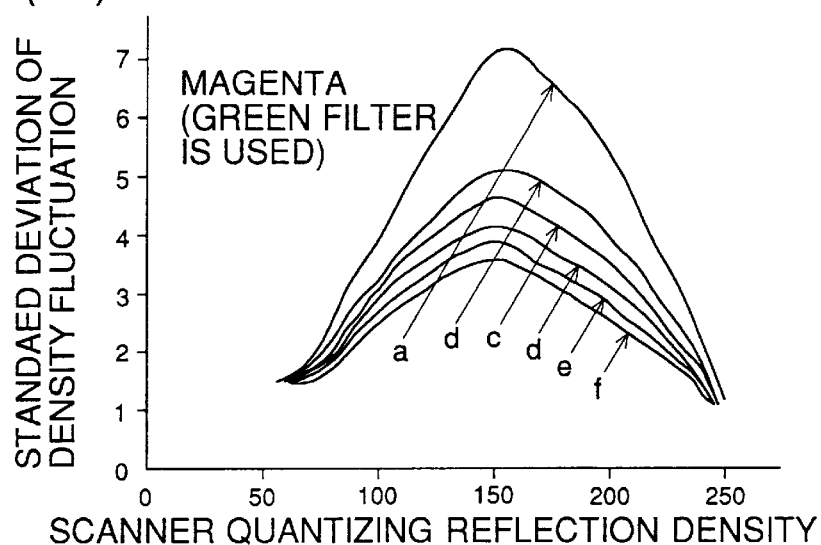
FIGS. 8(A), 8(B) and 8(C) are graphs showing the deviation of the density fluctuation of samples.
Figure 8:
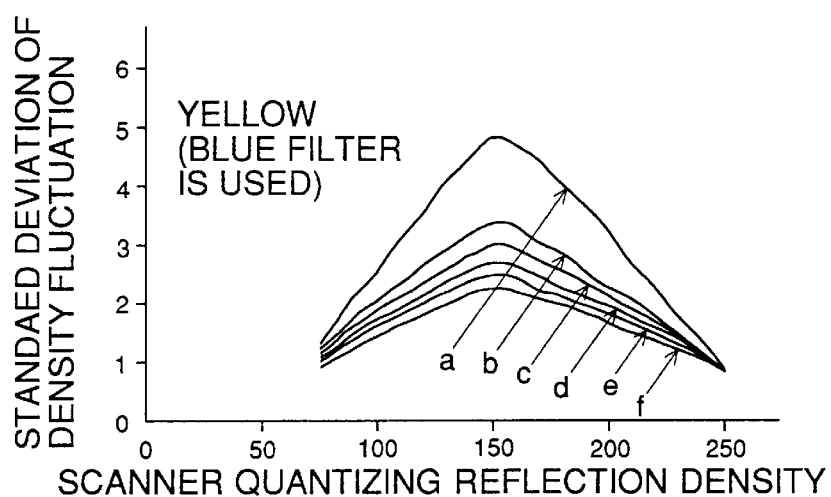
Figure 8:
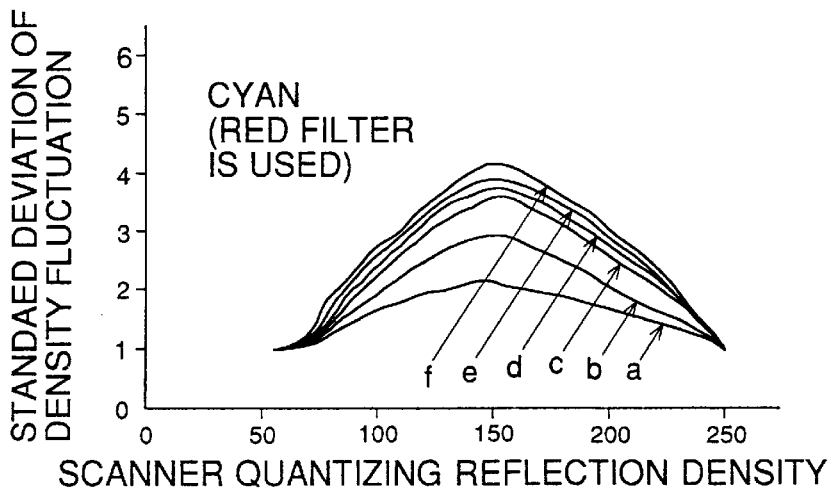

Referring to FIGS. 7 and 8, the comparative experiment of the monochromatic CPT of the present invention will be explained. Patterns of images, having density gradations which are changed corresponding to respective compounding ratios of the fluorescent substances P45 and P22, are displayed on the monochromatic CRT produced by changing the compounding ratio of the fluorescent substances P45 and P22. Then, the patterns are respectively printed on the color photographic paper through three color filters, and are developing-processed for evaluation.

1) Production of samples

The monochromatic CRTs of the example of the present invention and the comparative example are produced as follows. The compounding ratio of the fluorescent substances P45 and P22 (P45/P22) is changed. The mixture is naturally and uniformly precipitated on the tube surface of the monochromatic CRTs in the solution, and samples having the following compounding ratios are produced. Sample a=5:95, sample b=30:70, sample c=50:50, sample d=60:40, sample e=70:30, and sample f=75:25.

2) Contents of experiments

①  The monochromatic CRT of the sample is used, and patches, in which the luminance is divided into 25 gradations (a-1 through a-25) as shown in an evaluation explanation view (A) of the monochromatic CRT shown in FIG. 7, are displayed on the monochromatic CRT.

②  The patches, displayed on the monochromatic CRT, respectively pass through the blue, green and red filters, and are printed on the color photographic paper.

③  The color photographic paper is developing-processed and printed.

④  In the printed 25 gradation areas (a-B1 through a-B25), each gradation area is scanned by a reflection densitometer, and the scanner quantization reflection density of 100 thousand portions is measured for each area.

Here, the following reflection densitometer is used. A logarithm of the ratio of the incident light to the reflection light of the normal reflection density, in the scanner quantization reflection density, is between approximately 0 and 3, and this value is divided into 256 values. As shown in illustration view (B) of the evaluation of the monochromatic CRT in FIG. 7, since there is non-uniformity of density in each of the 25 gradations, the density distribution is made. For example, a difference of the density distribution exists between a portion of the scanner quantization reflection density of 10, and a portion of the scanner quantization reflection density of 180. Concerning the standard deviation, when the standard deviation is set to ±1 in the scanner quantization reflection density area of 10, and is set to ±5 in the scanner quantization reflection density area of 180, the degree of graininess can be presumed corresponding to the value of the standard deviation.

Further, as the graininess of the density of 25 gradations, generation of stripes are inspected visually on an enlarged print.

Figure 6:
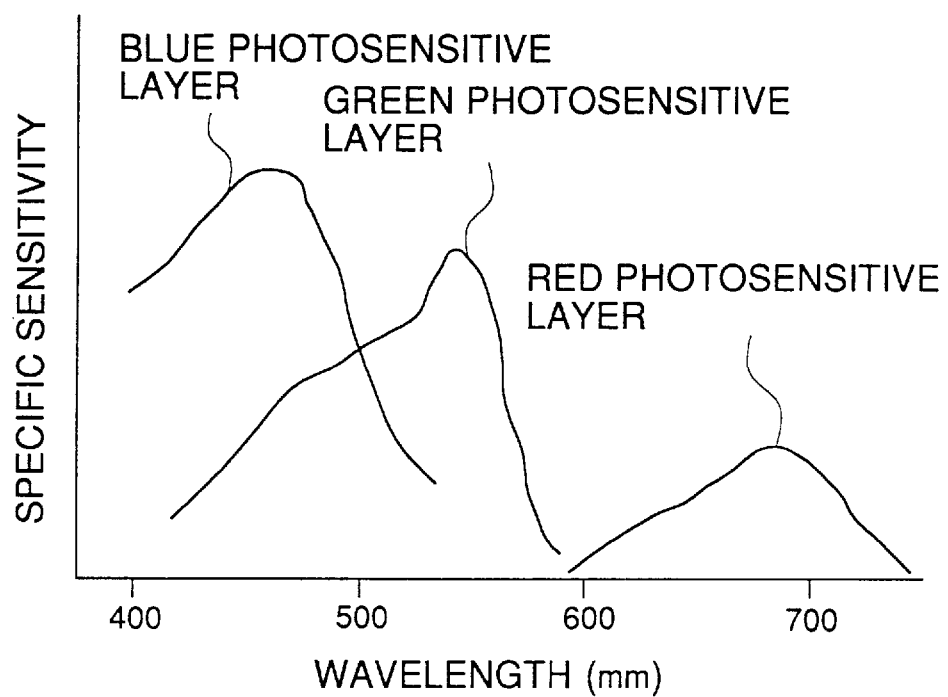
FIG. 6 is a graph showing the spectral sensitivity of a color photographic paper.

In this experiment, color photographic paper having the spectral sensitivity as shown in FIG. 6 is used.

3) Evaluation methods

① An enlarged gradation area printed on the photographic paper is checked visually and evaluated according to the following three points.

◯; no graininess

Δ; negligible graininess

X; some graininess

② The standard deviation of the non-uniformity of the density in the scanner quantization reflection density of 150 on the print is used for evaluation.

4) Results

FIG. 8 shows deviation of non-uniformity of the density of samples. More specifically, FIG. 8 shows the distribution of the standard deviation of the non-uniformity of the scanner quantization reflection density of yellow, magenta, and cyan of samples a through f. The horizontal axis shows the scanner quantizing reflection density, and the vertical axis shows the standard deviation of the non-uniformity of the density.

The results of evaluation by the visual check and that of the non-uniformity of the density in the scanner quantization reflection density of 150 of the graininess of yellow, magenta, and cyan of the samples a through f are shown in Table 1.

TABLE 1

| Sample | Compounding ratio | Evaluation by visual check | Standard deviation of scanner quantization reflection density | | | Remark |
| --- | --- | --- | --- | --- | --- | --- |
| | | | Blue filter | Green filter | Red filter | |
| a | 0.05 | X | 5 | 7 | 2.2 | Comparative example |
| b | 0.42 | X | 3.5 | 5 | 3 | Comparative example |
| c | 1.0 | ◯ | 3.1 | 4.5 | 3.6 | Present invention |
| d | 1.5 | ◯ | 2.8 | 4 | 3.8 | Present invention |
| e | 2.33 | Δ | 2.6 | 3.8 | 4 | Comparative example |

TABLE 1-continued

| Sample | Compounding ratio | Evaluation by visual check | Standard deviation of scanner quantization reflection density | | | Remark |
| --- | --- | --- | --- | --- | --- | --- |
| | | | Blue filter | Green filter | Red filter | |
| f | 3 | X | 2.4 | 3.5 | 4.2 | Comparative example |

Values in scanner quantization density of 150

As shown in FIG. 8, the non-uniformity of the density changes according to the mixing value of fluorescent substances P45 and P22. In FIGS. 8(A) and 8(B), the graininess increases as the compounding ratio of P45 is reduced. In FIG. 8(C), the graininess increases as the compounding ratio of P45 is increased. This is due to the following reasons. In FIGS. 8(A) and 8(B), since exposure is conducted through blue and green filters, the graininess is greater as the compounding ratio of P45 is reduced. On the contrary, in FIG. 8(C), since exposure is conducted through a red filter, the graininess is increased as the compounding ratio of P45 is increased. In the actual printing process, exposure is conducted as follows. The exposure is conducted by using the three color filters mentioned above, and the images are respectively superimposed on the photographic paper. Accordingly, when the compounding ratio of the fluorescent substance is deviated to one side, for example, in the case where P45:P22=5:95, the graininess is strong in yellow and magenta on the photographic paper. On the contrary, when P45:P22=25:75, the graininess on the photographic paper is strong in cyan. When the compounding ratio of P45 to P22 is approximately 1, the graininess is not conspicuous, from a result of the check of measured data or visual check.

Figure 9:
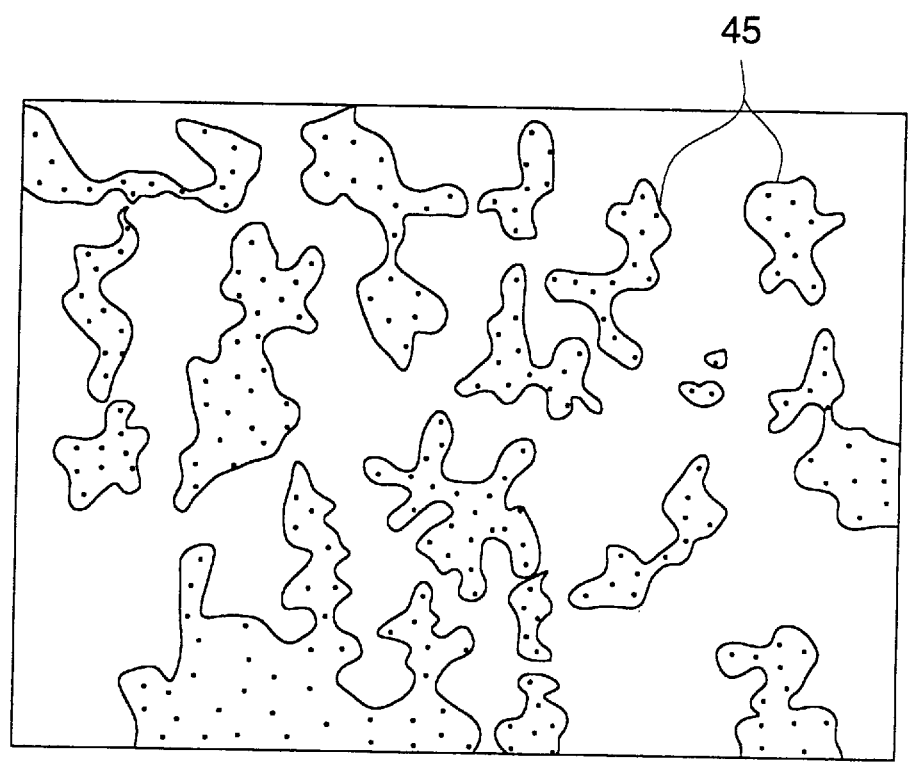
FIG. 9 is a view showing an example of graininess of a print.

Further, as shown in Table 1, when the example of the present invention is compared to the comparative example, the graininess of the example of the present invention is negligible and results in a satisfactory print. As shown in the condition of graininess in FIG. 9, when the image on the monochromatic CRT of the comparative example is exposed and checked, some graininess is observed in the area 45.

Figure 2:
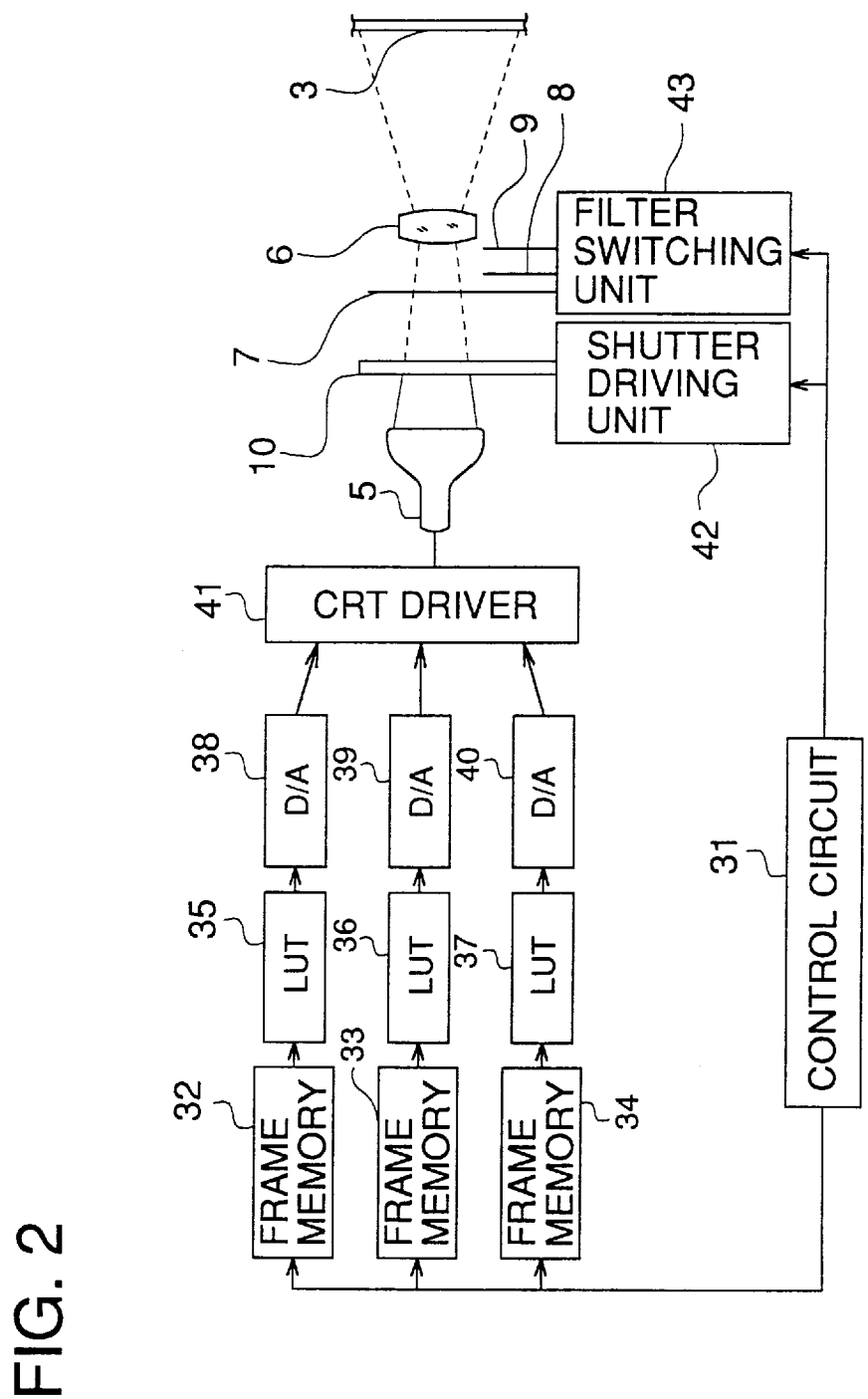
FIG. 2 is a block diagram showing the structure of an electrical control apparatus of an example of the present invention.

Referring to FIGS. 1 and 2, the image printing apparatus of the example of the present invention will be described below.

FIG. 1 is a schematic view of the image printing apparatus of the present invention. A detachable magazine 2 is set at the left lower portion of the main body 1, and a roll of color photographic paper 3 is accommodated in the magazine 2. This color photographic paper 3 has characteristics of spectral sensitivity in which the sensitivity in the red wavelength area is very low as compared to that in the blue wavelength area (refer to FIG. 6). An exposure chamber 4 is formed on the inside left of the main body 1, and a monochromatic CRT 5 is accommodated therein. Only at the time of printing, a monochromatic image, in which a blue image, a green image and a red image are respectively displayed in the lightness, is respectively displayed on the monochromatic CRT 5.

For the monochromatic CRT 5, a high luminance CRT is used, and a fluorescent substance, in which the ratio of P45/P22 is 0.67 through 1.5, and which is produced by a natural precipitation method, is used. The spectral luminance characteristic, in which the ratio of P45/P22 is 1.5, is shown in FIG. 3.

A mirror 11, by which the optical path of the image displayed on the monochromatic CRT 5 is deflected, and a lens 6, by which an image is formed on the color photographic paper 3, are arranged between the monochromatic CRT 5 and the color photographic paper 3. On the monochromatic CRT 5, a monochromatic image, in which blue, green, and red images are displayed in the lightness, is displayed. In order to convert the monochromatic image into single color images of yellow, magenta, and cyan, a blue filter 7, green filter 8, and red filter 9 are arranged and selectively inserted into the optical path of the lens 6. Further, a shutter 10 is provided in the optical path of the lens 6, and is opened only at the time of exposure.

Each frame of the rolled color photographic paper 3, accommodated in the magazine 2, is drawn from the magazine by respective pairs of nip rollers 12, 13 and 14, and is fed to the exposure position. A pressure plate 17 is located at this exposure position and the color photographic paper 3 is horizontally held thereon. Monochromatic images, formed by a combination of the CRT 5 and a blue filter 7, green filter 8, and red filter 9, are sequentially printed on the color photographic paper 3 by a sequential exposure method.

A development processing chamber is formed in the right interior of the main body 1. A developing tank 22, a washing tank 23, a drying chamber 24 and a cutter 25 are provided in the development chamber. A plurality of rollers 26 for conveying the color photographic paper 3 are appropriately provided between above-described devices. In this development chamber, the exposed color photographic paper 3 is sequentially processed through development, fixing, washing, and drying processes, and then, the color photographic paper 3 is cut one frame at a time. After that, the thus cut color photographic paper 3 is delivered onto a tray 27.

FIG. 2 is a block diagram showing the structure of an electric control apparatus. An image is inputted from a color TV or a VTR, etc., which are widely known, into this control apparatus. Each blue pixel is converted into a density signal, and the logarithmic-converted blue density signal is color-compensated, and then, written into a frame memory 32. The blue image signal, recorded into the frame memory 32, is gradation-compensated for by data from a look-up table (LUT) 35 corresponding to a gradation characteristic of the color photographic paper 3. After that, the compensated blue image signal is converted into an analog signal by a D/A 38 of a D/A converter. Since signal systems of a green signal and red signal are the same as that of the above-described blue signal system, only code numbers are given to each circuit and the explanation of each circuit will be omitted here.

A CRT driver 41 sequentially selects each color from the inputted three-color composite image, and displays the composite image on the monochromatic CRT 5. Each color filter is selectively inserted into the optical path by a color filter switching unit 43 disposed between the monochromatic CRT 5 and the color photographic paper 3. A shutter 10 is driven by a shutter driving unit 42. The control circuit 31 controls each section as described above, and further, controls data writing into the look-up table, and the like.

This example of the present invention is structured as described above, and accordingly, it has the following advantages. That is, the monochromatic CRT for the image printing apparatus, in which the graininess of luminance is very rare, is obtained when the appropriate compounding ratio of the fluorescent substance P45 and the fluorescent substance P22 is selected by the simple natural precipitation method, by this example of the present invention.

Further, when the monochromatic CRT, which very rarely shows graininess of the luminance, is used, an image printing apparatus is provided by which a print of high quality having negligible graininess can be obtained.

Next, an example of the present invention to attain the above-described object, in an exposure apparatus which can be applied also for the image printing apparatus shown in FIG. 1, will be described.

Figure 10:
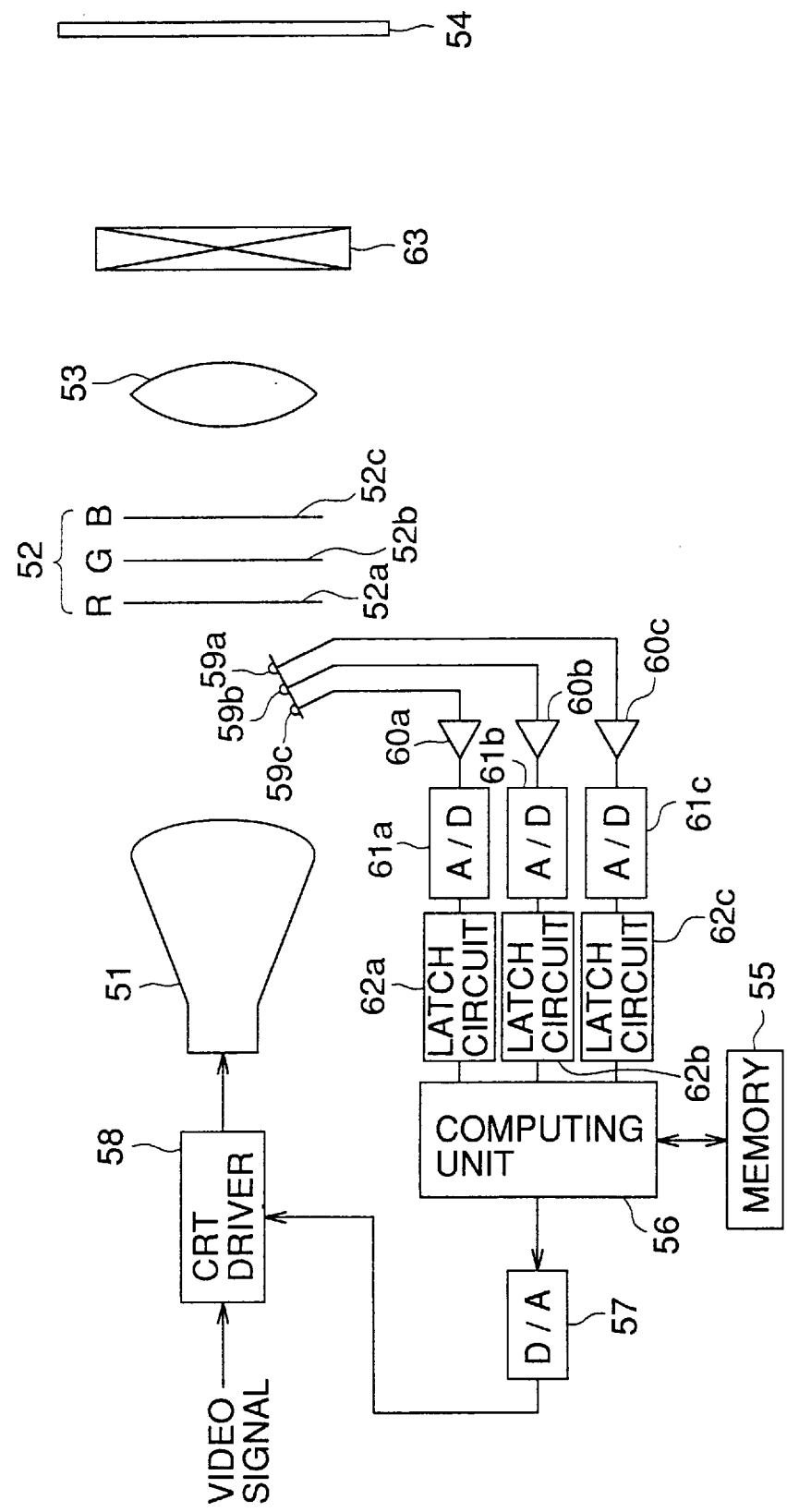
FIG. 10 is a schematic view showing the system structure of an image recording apparatus of an example to attain the second object of the present invention.

FIG. 10 is a view showing a structure of a system of an image recording apparatus in an example by which the second object of the present invention is accomplished.

A monochromatic image in which a blue image is expressed by the lightness, a monochromatic image in which a green image is expressed by the lightness, and a monochromatic image in which a red image is expressed by the lightness, are successively displayed on a monochromatic CRT 51 (a monochromatic image display means) according to a color image signal which is color-separated into the three primary colors of red, green and blue. A blue filter 52*a*, a green filter 52*b* or a red filter 52*c*, which comprise an exposure color filter 52, are selectively inserted successively into the optical path, corresponding to the display of the monochromatic image which is switched on the CRT 51, and when an optical image of a monochromatic image displayed on the monochromatic CRT 51 transmits through the exposure color filter 52, the monochromatic image is respectively converted into a blue image, a green image or a red image.

A mono-color image converted for each separation color is successively exposed onto a color photographic paper 54 through an image formation lens 53, and a color image is printed onto the color photographic paper 54.

In FIG. 10, numeral 63 is a shutter disposed between the image formation lens 53 and the color photographic paper 54.

Figure 11:
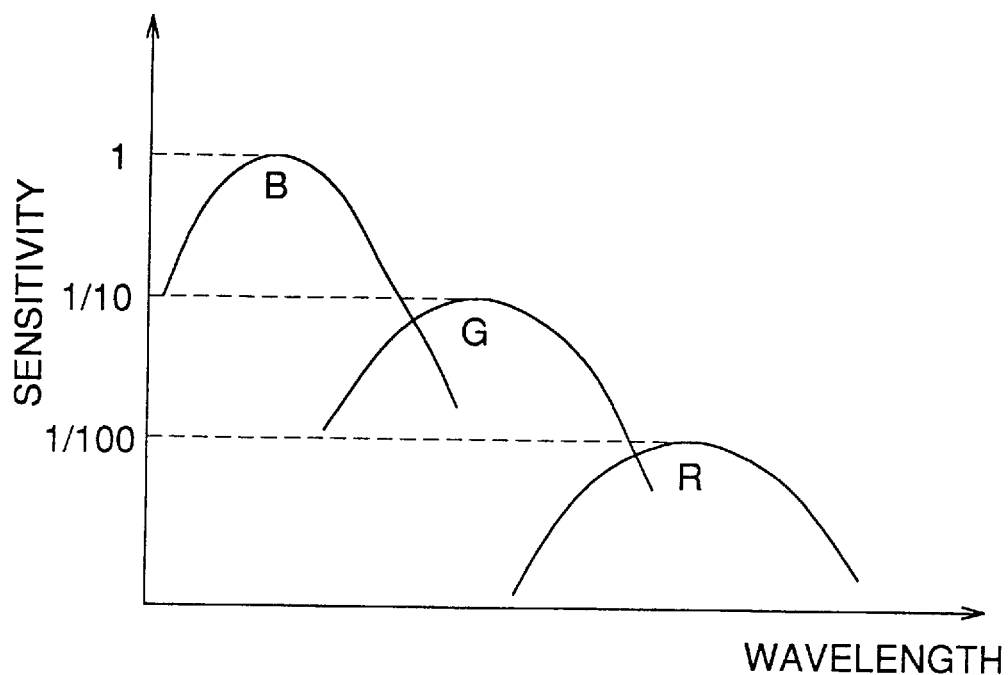
FIG. 11 is a graph showing the sensitivity characteristics of color photographic paper.

In this connection, regarding the spectral sensitivity of the color photographic paper 54, generally, the sensitivity of green is about $\frac{1}{10}$ of that of blue, and the sensitivity of red is about $\frac{1}{100}$ of that of blue, as shown in FIG. 11, when the sensitivity with respect to the wavelength area of blue, which is the highest sensitivity, is used as a reference.

Accordingly, it is necessary that, specifically, the exposure time of a red image is much longer than the exposure time of a blue image, in a structure in which the emitting luminance (an absolute value of the luminance and the contrast) of a monochromatic CRT 51 is made equal for each separation color, and exposure is carried out. However, in this example, the emitting luminance (exposure luminance) is set previously for each separation color according to the spectral sensitivity of the color photographic paper 54, so that an image having a predetermined color balance can be recorded in nearly equal exposure times for each color, and stored in a memory 55.

That is, in the case where a monochromatic image, in which a red image is expressed by a lightness, is displayed, with respect to the case where a monochromatic image, in which a blue image is expressed by a lightness, is displayed, the emitting luminance of the monochromatic CRT 51 is set to be relatively enhanced, and the exposure energy per unit time is also relatively enhanced in the wavelength area in which the sensitivity is lower, so that the image is exposed within nearly equal exposure times for each color.

Then, at the time of image recording, a computing unit 56 reads a target value of the emitting luminance (exposure luminance), which is predetermined for each color, from the memory 55 (the exposure luminance setting means), according to which color of the separation colors is recorded. The target value is outputted to a CRT driver 58, into which a video signal is separately inputted, through a D/A converter 57. In the CRT driver 58, which is an emitting luminance control means, the emitting luminance in the monochromatic image display is controlled according to the inputted target value of the emitting luminance for each separation color.

In this connection, the following structure may be adopted: a color video signal to be inputted into the CRT driver 58 is previously compensated for according to the target value of the emitting luminance read from the memory 55; and the video signal, after compensation, is outputted to the CRT driver 58.

Due to the above structure, even when the spectral sensitivity is quite different for each separation color in the color photographic paper 54 as shown in FIG. 11, a predetermined color image recording is carried out within nearly equal exposure times. Accordingly, the exposure control is simplified, and effective recording can be carried out. Further, when the exposure time for each separation color is nearly equal, compensation for exposure time, in the case where the luminance of the monochromatic CRT 51 is lowered due to deterioration, can also be easily carried out.

Further, it is not necessary that a ratio of a specific fluorescent substance is set to be greater in the compounding ratio of the fluorescent substance of the monochromatic CRT 51 to relatively increase the emitting luminance in the wavelength area in which the sensitivity of the photographic paper is low, in order to meet the difference of the spectral sensitivity. Accordingly, the occurrence of flocculation of the fluorescent substance, due to the increase of the ratio of the specific fluorescent substance, can be prevented.

Figure 12:
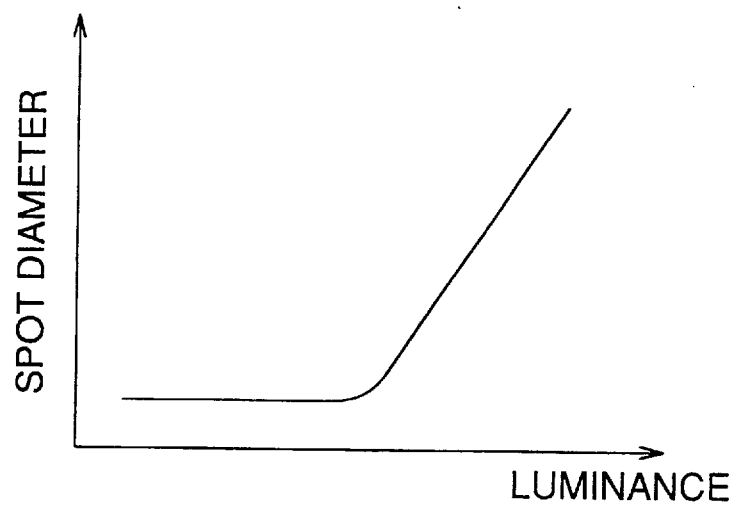
FIG. 12 is a graph showing the correlation of the luminance in a monochromatic CRT to a spot diameter.

A spot diameter on the CRT screen has characteristics in which it is approximately proportional to the luminance value in a range more than a predetermined luminance value, and the spot diameter becomes smaller, and saturated in the range smaller than a predetermined luminance value, as shown in FIG. 12. In the image recording process, the spot diameter on the photographic paper is more important than it is on the CRT screen. It is desirable that the difference of the spot diameter for each separation color is as small as possible on the photographic paper.

In this connection, the spectral luminance distribution changes due to ambient temperature variations and changes over time on the monochromatic CRT 51. Even when the luminance is adjusted according to the target emitting luminance, which is previously set, errors sometimes occur in the actual emitting luminance for each color. For example, in the case where the emitting luminance in a blue area is relatively weakened, when exposure is carried out under the same luminance control condition as under the initial condition, then, the exposure energy of blue is lowered as a result, and the color balance in the recording image is lowered.

In this example, in order to detect the change in the spectral luminance distribution of the monochromatic CRT 51, three photoelectric conversion elements 59a, 59b, and 59c (a luminance distribution detection means) are provided, which are respectively provided with red, blue and green filters corresponding to separation colors for image recording, and an emitted light beam from the monochromatic CRT is color-separated and photoelectrically converted by the photoelectric conversion elements 59a, 59b and 59c.

After output from the photoelectric conversion elements 59a, 59b and 59c is respectively amplified by amplifiers 60a, 60b and 60c, this output is A/D-converted by A/D converters 61a, 61b and 61c, and then, latched by latch circuits 62a, 62b and 62c.

Figure 13:
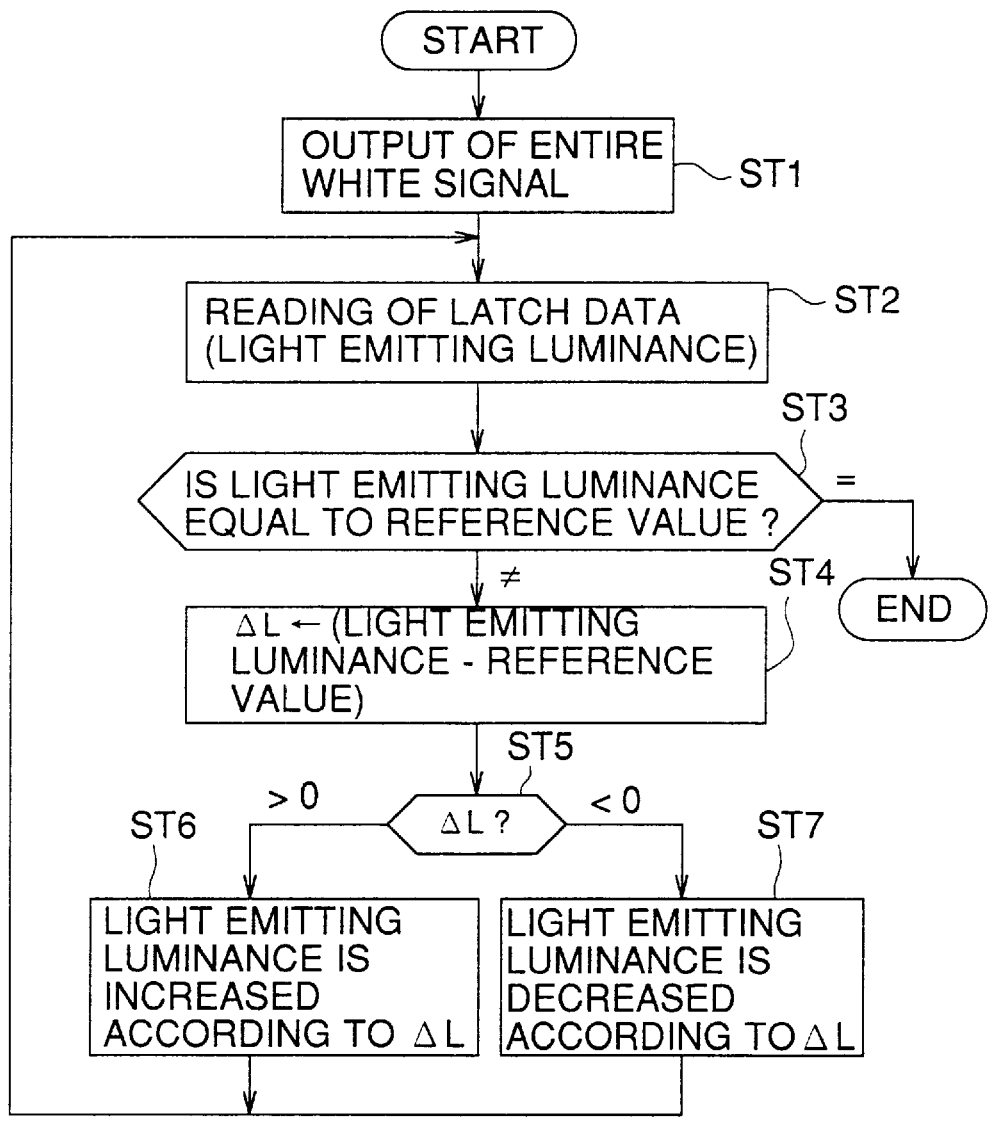
FIG. 13 is a flow chart showing compensation control of the emitting luminance in accordance with detection of a spectral luminance distribution.

Here, the luminance adjustment, to meet changes in the spectral luminance distribution of the monochromatic CRT 51, is carried out as shown by a flow-chart in FIG. 13.

For example, in the case where the adjustment is carried out with respect to the change of luminance of a red component, the CRT 51 is set to a luminance adjustment condition corresponding to the exposure for red, and the entire white signal (the maximum value in a digital image signal, that is, for example, 255 in the case of 8 bits signal) is displayed on the monochromatic CRT 51 (ST1). Then, the output (the actual emitting luminance) of the photoelectric conversion element 59a is read from the latch circuit 62a (ST2). Here, the reference value (the normal value), which is previously stored as a value detected when the normal luminance is generated on the CRT, is compared with the read out detection data (ST3). When the detected value is not equal to the reference value, the luminance adjustment is carried out to make the emitting luminance coincide with the normal value.

In the above luminance adjustment, initially, the difference $\Delta L$ between the detected emitting luminance and the reference value (the normal value), is found (ST4), and then, it is judged whether the actual emitting luminance is lower than the reference value according to the difference $\Delta L$ (ST5). When the actual emitting luminance is lower than the reference value, the luminance control value is corrected corresponding to the difference $\Delta L$ to increase the emitting luminance on the monochromatic CRT 51 and sent to a CRT driver 58 (ST6: the luminance compensation means). Conversely, when the emitting luminance is larger than the reference value, the luminance control value is corrected corresponding to the difference $\Delta L$ to reduce the emitting luminance on the monochromatic CRT 51 and sent to a CRT driver 58 (ST7: the luminance compensation means). Then, the result of the luminance correction is again judged according to the output of the photoelectric conversion element 59a. When the actual emitting luminance coincides with the reference value, the luminance adjustment is completed, and the exposure for red is carried out from this time under the luminance control condition on the adjustment completion stage.

Similarly, concerning blue and green, the luminance adjustment is independently carried out respectively, and normal emitting luminance can be obtained for each color.

Due to this structure, even when the spectral luminance distribution of the monochromatic CRT 51 is changed due to environmental changes or deterioration over time, the emitting luminance is adjusted for each separation color corresponding to these changes. Accordingly, even when a change occurs in which the luminance in a specific wavelength area is lowered in the spectral luminance distribution, the loss of color balance of the image to be recorded can be prevented.

For example, in the case where the luminance in the blue wavelength area on the monochromatic CRT 51 screen is lowered to less than that of the initial condition due to deterioration over time, or the like, that is, in the case where the fluorescent substance for blue light emission is deteriorated more than other fluorescent substances, the compensation is carried out to increase the emitting luminance during blue image recording. Thereby, a decrease of exposure energy at the time of blue image recording is prevented, and a color image of a predetermined color balance can be recorded.

In this connection, instead of the photoelectric conversion elements 59a, 59b and 59c, which are respectively provided with filters for each color as described above, a photoelectric conversion element (the luminance distribution detection means) for receiving a light beam transmitted through the exposure color filter 52 is provided, and this system may be structured such that the luminance for each separation color is successively detected by selectively inserting the exposure color filter 52. In this structure, only one photoelectric conversion element is necessary, and further, the processing circuit is more simplified. However, when the system is composed of photoelectric conversion elements of 59a, 59b and 59c, there is an advantage in which the system is not affected by the setting of the transmission ratio of the exposure filter 52, and the luminance for each color can be detected simultaneously.

Further, when the system is structured such that the luminance is detected by the photoelectric conversion elements 59a, 59b and 59c within the display screen of the CRT 51, the luminance on the entire screen or one portion of the screen may be detected. In this case, it is preferable that the area to be detected is limited to a predetermined area in the vicinity of the central portion on the monochromatic CRT 51 screen.

Specifically, only a light beam emitted from a portion in the vicinity of a central portion on the monochromatic CRT 51 screen is guided through a lens to the photoelectric conversion elements 59a, 59b and 59c. Generally, since the luminance is relatively stable in the vicinity of the central portion of the screen even when some disturbance occurs on the display, when the area in which the luminance in the vicinity of the central portion is stable, is previously found and this area is specified as the luminance detection area, the luminance distribution can be accurately detected. Further, when an area in the vicinity of the central portion of the screen is defined as the detection area, a shift of the display position or the sensor position does not largely affect the luminance detection, and the luminance detection can also be highly accurately carried out for this reason.

As described above, by the image recording apparatus in this example, the emitting luminance when the monochromatic image is displayed, is controlled for each separation color, and therefore, the exposure energy can be different for each color without making the exposure time too different from each other, and without changing the compounding ratio of the fluorescent substance in the image display means.

Further, when the exposure luminance for each separation color corresponding to the spectral sensitivity distribution of the color photographic paper is set, color image recording can be carried out with excellent color balance without making the exposure time too different for each color.

Still further, even when a change occurs in the spectral luminance distribution due to deterioration over time or the like, in the monochromatic image display means, this change in the color balance is compensated for, and a predetermined color image recording can be carried out.

Furthermore, the spectral luminance distribution of the monochromatic image display means can be accurately detected, and further still, the spectral luminance distribution of the monochromatic image display means can be simultaneously and stably detected for each separation color.

Still further, the luminance distribution for each separation color on the screen of the monochromatic image display means can be detected by a simple structure using the color separation with the exposure color filter.

Yet further, even when some disturbance occurs in the display, since the luminance is detected in a portion in the vicinity of the central portion of the screen in which the luminance is relatively stably generated, the luminance distribution can be detected accurately.

Figure 14:
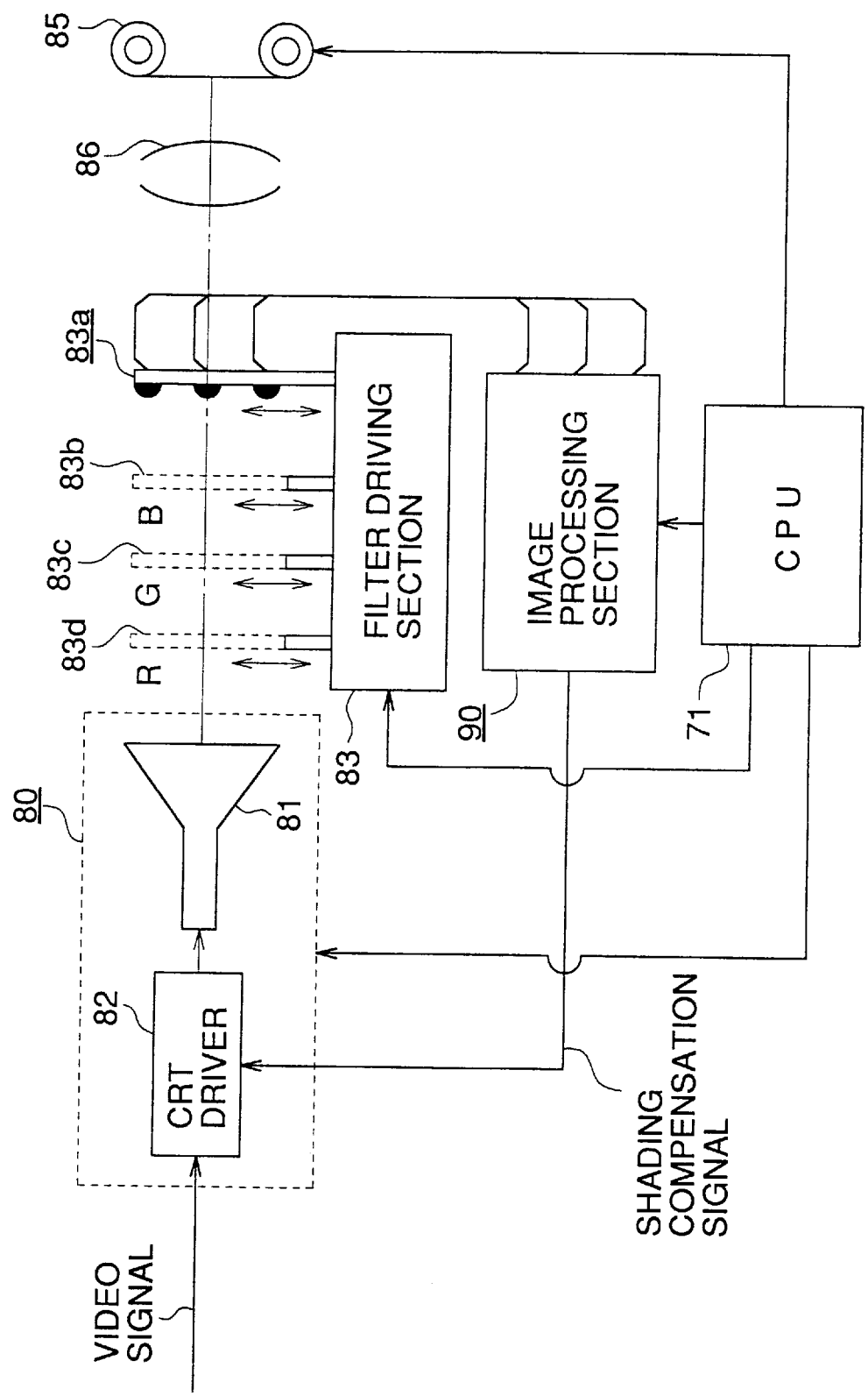
FIG. 14 is a schematic view showing the general structure of an optical image recording apparatus in an example by which the third object of the present invention is accomplished.

FIG. 14 is a view showing the outline structure of an optical image recording apparatus according to an example with which the third object of the present invention is accomplished.

In FIG. 14, a CPU 71 is a micro processor by which image compensation or exposure control of the entire apparatus is carried out. Operations in an exposure apparatus are largely separated into a shading compensation stage in which the luminance adjustment of a frame image, displayed in an optical image display means such as a monochromatic CRT, is carried out, and an exposure stage in which exposure is actually conducted onto a recording medium such as a sheet of photographic paper after the shading compensation. In this example, a monochromatic CRT is explained as an example of the optical image display means, however, a liquid crystal display apparatus is also included in the present invention.

In the shading compensation stage, a CRT section 80 has a monochromatic CRT 81 and a CRT driver 82. When a video signal is inputted into the CRT section 80 from outside of the apparatus, a frame image for shading compensation is formed on the monochromatic CRT 81 through the CRT driver 82. Although a video signal having the standard luminance is desirable, normally, a white signal having the maximum luminance L is used. Here, the CRT driver 82 includes a cathode and a grid of the monochromatic CRT 81, and is located in the CRT 81. When a shading compensation signal, which will be described later, is inputted into the grid, the luminance of the video signal inputted into the cathode is compensated for and controlled. In this connection, the shading compensation may be conducted onto the video signal, inputted into the cathode, by feed-back.

On the other hand, under the control of the CPU 71, a filter driving section 83 inserts a light shielding filter 83a into the optical path of the monochromatic CRT 81, and thereby, the light beam onto a sheet of the photographic paper 85, which is a recording medium located at the rear of the filter, is shielded. At the same time, an image processing section 90, as an image compensation means, inputs a luminance signal into a plurality of luminance sensors S1 through S9, which are arranged two-dimensionally on the light shielding filter 83a, that is, horizontally and vertically, and conducts the shading compensation.

Figure 15:
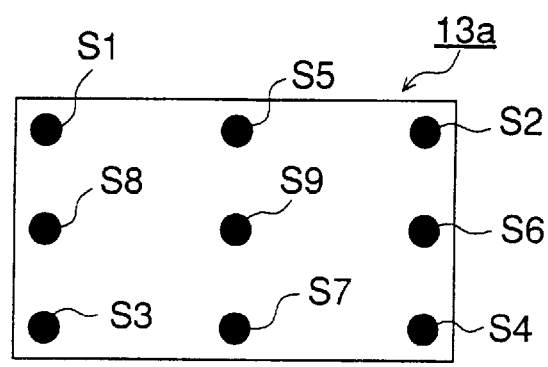
FIG. 15 is a view showing an example of arrangement of luminance sensors in the above example.

FIG. 15 shows an example of the arrangement of the luminance sensors. The luminance sensors S1 through S9 are arranged at predetermined coordinates on the light shielding filter 83a, and measure the luminance at the same coordinates on the monochromatic CRT 81. That is, spots, each having the luminance L in a small area, are displayed on the monochromatic CRT 81, and these spots are subjected to photometry by the luminance sensors S1 through S9 respectively arranged on the extended lines of optical axes which pass through the center of each spot. Accordingly, the luminance at the predetermined coordinates can be measured precisely without being affected by peripheral light beams. In other examples, a frame image having the luminance L is displayed on the entire screen of the monochromatic CRT 81, and a hood or slit for exposure is provided on the luminance sensor side, or a sensor having high directivity is used, both of which can produce the same effect. Here, as a luminance sensor, a photo-diode or a photo-sensor is preferable in terms of performance and cost considerations.

As described above, since the luminance in the optical path of the frame image can be detected directly by the luminance sensors provided on the light shield filter 83a, the accuracy of the image compensation can be increased.

Next, referring to FIG. 16, the image processing section 90 will be described.

Figure 16:
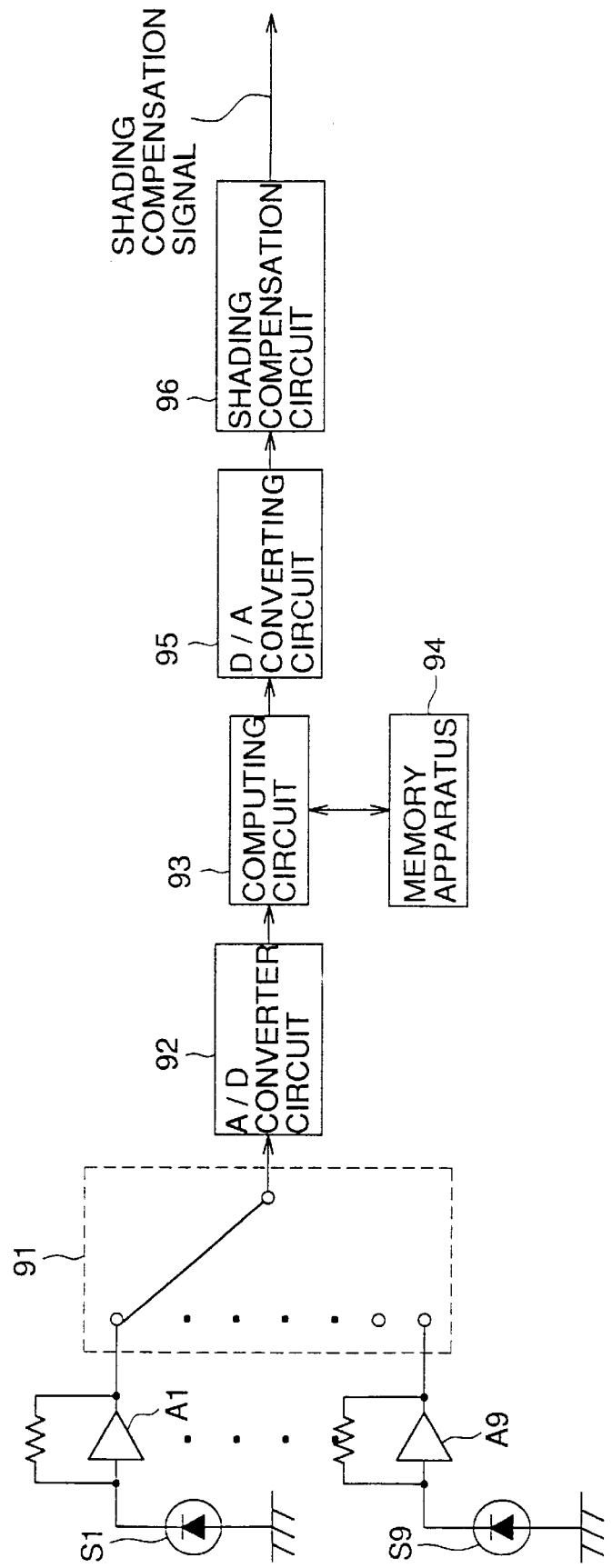
FIG. 16 is a general block diagram of an image processing section in the above example.

FIG. 16 is an outline block diagram of the image processing section 90. Analog luminance signals sent from the luminance sensors are respectively amplified by operation amplifiers A1 through A9, successively switched by a switch 91, outputted to an A/D conversion circuit, and then, converted into digital signals. Then, the luminance signal is temporarily written into a memory apparatus 94 as image data. When this image data is inputted from the memory apparatus 94 into a computing circuit 93, this image data is compared with a previously set reference value, and the following computation processing is carried out so that the difference is equal to 0. Here, the reference value is set to the maximum luminance L.

That is, concerning the luminance signal in the horizontal direction, generally, the luminance at the central portion of the CRT 81 is maximum, and the luminance on the CRT 81 tends to lessen toward the periphery of the CRT. Accordingly, when the luminance signals from the luminance sensors S8, S9, and S6 are inputted, the following characteristics are shown: the signal from the luminance sensor S9 is closest to the reference value; and the signals from luminance sensors S8 and S6 are lower than the reference value. Accordingly, in the computing circuit 93, the signals from the above-described three measuring points are interpolated, and an output value of the luminance signal of one horizontal line is obtained. After that, shading data is obtained by the following operations: a multiplication operation is carried out so that luminance signals of both sides of the one horizontal line, which is closest to the reference value, are amplified to the maximum by gains which are appropriately different from each other. Also, in the vertical direction, similar interpolations and operations are carried out so that shading data is obtained.

In this example, shading data is obtained from three measuring points in both the horizontal and vertical directions. This is to reduce loads on the operation processing in the computing circuit 93 and to minimize the capacity of the memory apparatus 94. It is possible to increase the number of measuring points in each direction according to the increase of the processing speed of the computing circuit 93 and an increase of the memory capacity of the memory apparatus 94. In such cases, more accurate shading data can be obtained.

Each shading data is inputted into a D/A conversion circuit 95, and converted successively into an analog signal. These signals are amplified in a shading compensation circuit 96 by a predetermined amplitude, and fed back to a grid in the CRT driver 82.

As described above, even when the luminance of the frame image on the monochromatic CRT 81 is dispersed, due to changes over time or temperature changes, the luminance is compensated for by the feed back in the image processing section 90, and is always converged into an appropriate value.

Shading compensation is optionally carried out after a predetermined number of exposures or after passage of a predetermined time, considering deterioration characteristics of the monochromatic CRT 81. During a predetermined number of exposure or passage of a predetermined time, the video signal is controlled according to image data written in the memory apparatus 94. If the feed-back compensation is carried out whenever the frame image is exposed onto the photographic paper 85, a memory apparatus 94 is not necessary, and a further cost decrease can be realized.

Next, the exposure stage will be described.

When the shading compensation is completed, the video signal for each of the three color separations is inputted into the CRT section 80, and each color frame image is formed. In timed relationship with this operation, the filter driving section 83 successively inserts a blue filter 83b, a green filter 83c and a red filter 83d so that the frame images are converted into separate mono-color images, and, at each time, the exposure is controlled when the operation of the light shield filter 83a is time-controlled as with a mechanical shutter. Thereby, the image is enlarged or reduced to a predetermined magnification ratio through a printing lens 86, and exposed onto the photographic paper 85 by superimposition by the additive color method.

In another example, when the exposure is controlled after the shading compensation has been completed, the light emitting time is controlled by the CPU 71, as an electronic shutter, by which the CPU 71 activates or inactivates the display of the frame image of the CRT 81, so that the exposure is controlled, instead of using the light shielding filter 83a as a mechanical shutter by which its operation time is controlled. Accordingly, the CPU 81 and the filter drive section 83, or the CPU 71 and the CRT section 80 have the function as an exposure control means.

In this example, the filter drive section 83 controls insertion and removal of color separation filters 83b, 83c, 83d, and the light shielding filter 83a. Accordingly, when a common drive source is used, further reduction of cost and size can be achieved.

Further, generally, several types of fluorescent substances are used for the monochromatic CRT so that the spectral luminances become equal to each other. However, when deterioration occurs due to changes over time, or the like, conditions for deterioration of the fluorescent substance are different from each other, and the emitting luminance of each color component disperses each other. Accordingly, it is preferable to periodically measure the emitting luminance of the fluorescent substance. In this example, when the light shielding filter 83a is located at the rear of color separation filters 83b, 83c and 83d such that the light shielding filter 83a can be inserted into or removed from the optical path, each color separation filter can be successively inserted into the optical path while the light shielding filter 83a is being inserted into the optical path, and the color balance can be quite simply measured. Thereby, color compensation is carried out, and the required image quality can be assured.

As described above, according to the present invention, the luminance of the display image in the optical path can be detected directly by the luminance sensors provided on the light shielding filter. Accordingly, a reduction of cost and size of the apparatus can be realized while the accuracy of the image compensation is assured.

In this connection, in an apparatus in which the exposure control means and the means for controlling the insertion and removal of each color separation filter are controlled by a common drive source, a further reduction of cost and size can be realized by using a common drive source.

Further, in the image compensation means structured such that the dispersion of the luminance of the frame image is compensated for by feed-back whenever the frame image is exposed onto the recording medium, a memory apparatus to store the image data for shading compensation is not necessary, and accordingly, further reduction of cost can be realized.

Still further, in an apparatus in which the light shielding filter is provided at the rear of each color separation filter, the color balance of the fluorescent substance, of the optical image display means corresponding to each color, is measured and color compensation can be carried out.

Figure 17:
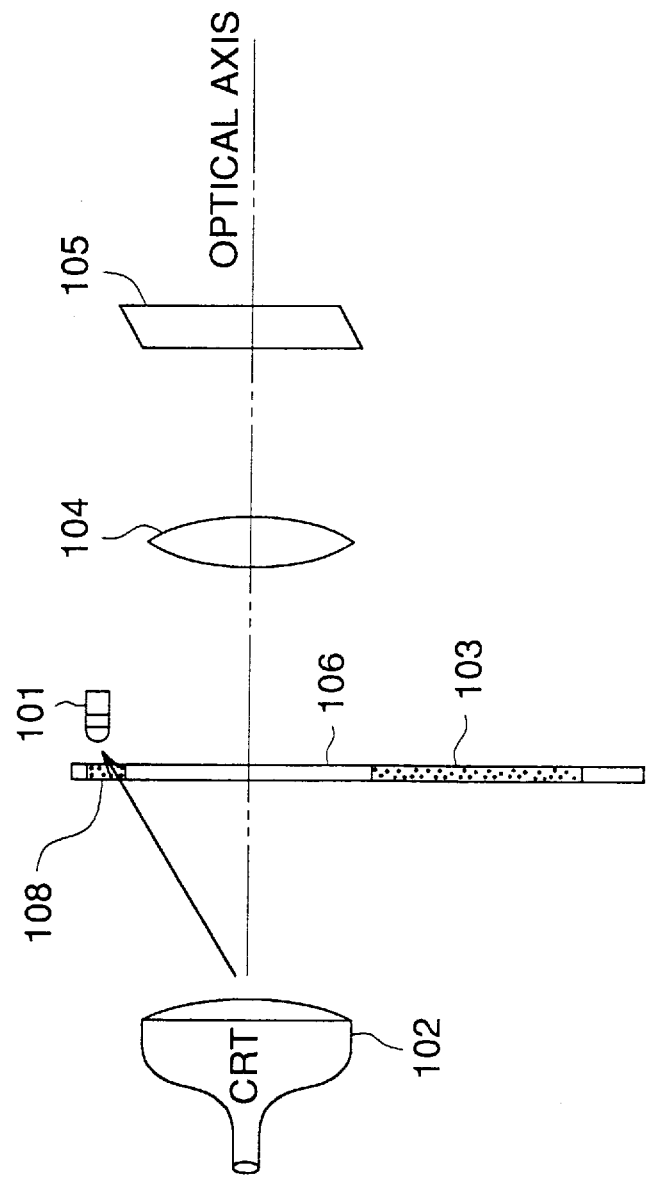
FIG. 17 is a schematic view showing the general structure of an exposing apparatus in an example by which the fourth object of the present invention is accomplished.

FIG. 17 is a view showing an outline structure of an exposure apparatus of an example by which the fourth object of the present invention is accomplished.

Initially, operations of the exposure apparatus are primarily divided into the following stages: a luminance composition stage, in which the luminance of the frame image displayed on the monochromatic CRT 102, as an optical image display means, is compensated for by a photometry sensor 101, as a luminance sensor, connected to a luminance compensation circuit, which will be described later; and an exposure stage, in which the optical image is actually exposed onto a recording medium, such as photographic paper 105, through an exposure color filter 103 and a lens 104 after the operation of the luminance compensation stage. In this connection, although a monochromatic CRT is explained as an example as the image display means in this example, any light source for the image, or the like, such as a liquid crystal display or the like, is included in the present invention.

Figure 18:
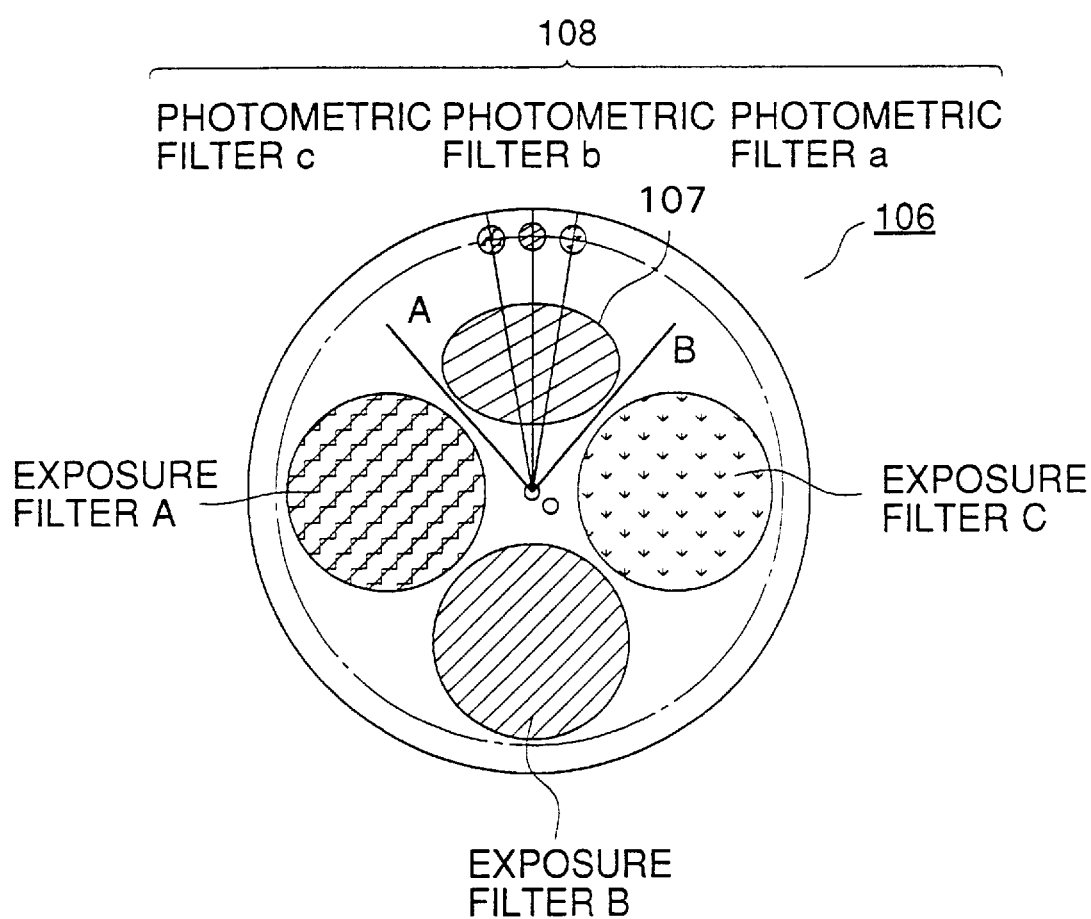
FIG. 18 is a detailed view of a rotation disk in the above example.

FIG. 18 is a detailed view of a rotation disk 106. A 3-color exposure color filter 103 (a red exposure color filter A, a green exposure color filter B and a blue exposure color filter C), and a light shielding section 107 are arranged on the rotation disk 106, as a rotation member, around the rotation axis O of the rotation disk 106. In the same way, a 3-color measuring filter 108 (a red measuring color filter a, a green measuring color filter b, and a blue measuring color filter c) is located in the upper portion of the light shielding section 107.

When the rotation disk 106 is provided in the apparatus, the exposure color filter 103 and the light shielding section 107 respectively cover the optical path through the rotation of the disk. Specifically, when the light shielding section 107 shields the optical path, each color filter of the measuring color filter 108 successively passes over the photometry sensor 101. In the drawing, the upper area enclosed by an imaginary line A–B is the area used for a shutter, and the lower area is the area used at the time of exposure.

The luminance correction stage and the luminance exposure stage will be successively explained.

Figure 19:
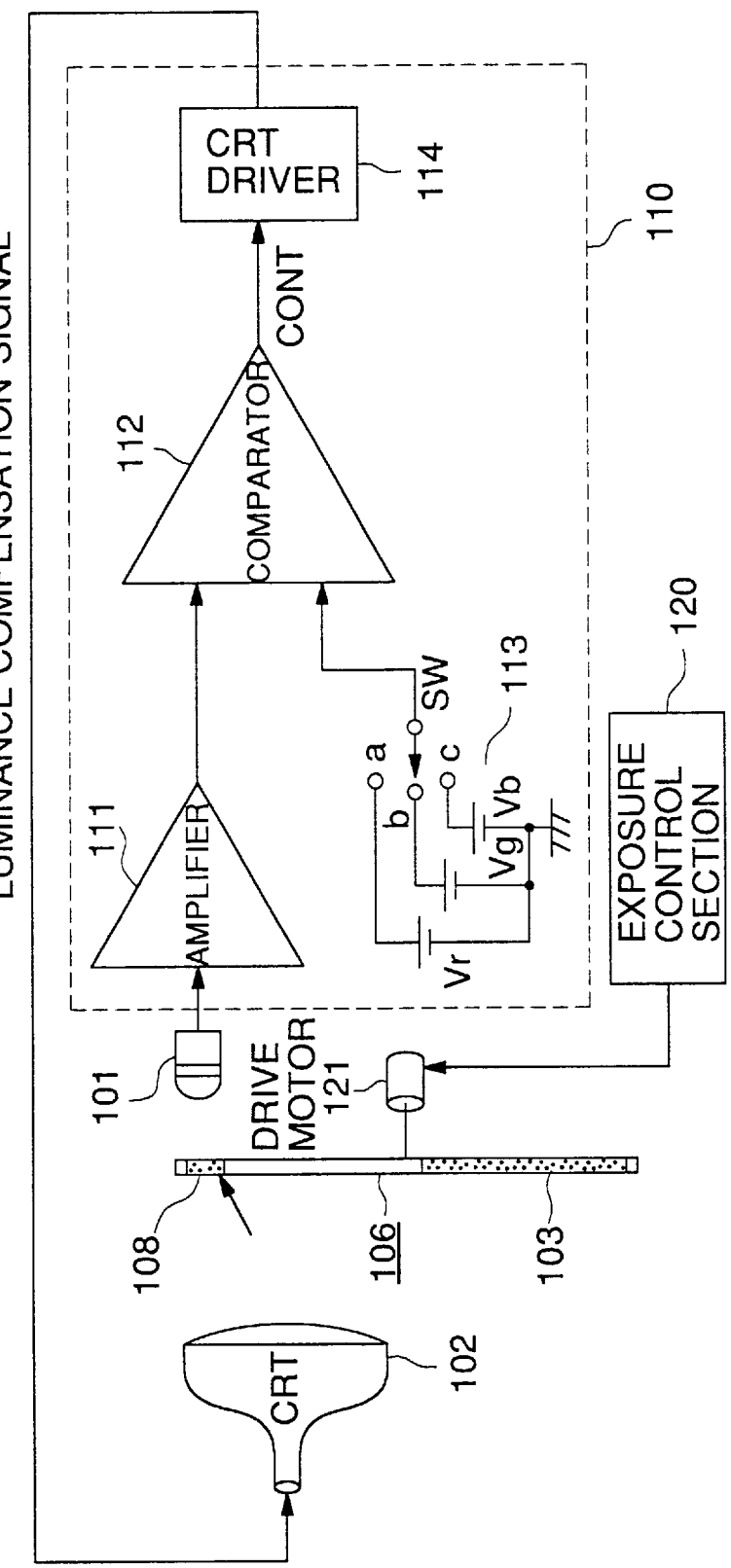
FIG. 19 is a view showing a luminance compensation circuit in the above example.

FIG. 19 shows the luminance compensation circuit in this example.

In the luminance correction stage, a photometry sensor 101 is connected to a luminance correction circuit 110, which is a luminance compensation means. By this sensor 101 and the luminance composition circuit 110, a quantity of light or the spectral characteristics of a monochromatic CRT 102, which is an optical image display means of the apparatus, is measured, and the luminance compensation or compensation of the exposure conditions such as exposure time, or the like, is carried out.

Initially, a drive circuit, which is not shown in the drawings, is provided in the monochromatic CRT 102. When a video signal is inputted from outside the apparatus into the monochromatic CRT 102, a frame image for the luminance compensation is formed on the monochromatic CRT 102 through the drive circuit. Although it is desirable that the video signal be a standard luminance signal, normally, a white light signal, having maximum luminance, is used.

The drive circuit is composed of a cathode and a grid of the monochromatic CRT 102. When a luminance compensation signal, which will be described later, is fed back into the grid, a compensation control, by which the luminance value of the video signal to be inputted into the cathode, is increased or decreased, is carried out. In this connection, the luminance compensation may be carried out by feeding back this luminance compensation signal into the video signal, which is inputted into the cathode.

When the exposure control section 120 controls the drive motor 121, the rotation disk 106 is rotated, and the shielding section 107 is moved into the optical path of the monochromatic CRT 102 so that the optical path is completely shielded. Simultaneously, the exposure color filter 'a' is positioned above the photometry sensor 101. Here, the amount of the rotation of the rotation disk 106 is recognized by a rotation disk position sensor, not shown in the drawing, and the exposure control section 120 carries out a rotation control of the rotation disk 106 at a predetermined angle.

A frame image for red luminance compensation, emitted from the CRT 102, is inputted into the photometry sensor 101 through the measuring color filter 'a', as an optical image expressing red luminance. Then, the luminance signal, photoelectrically converted by the photometry sensor 101, is amplified by an amplifier 111, and compared with the red reference voltage Vr by a comparator 112. When the difference signal of the comparison is inputted into the CRT driver 114, the amount of light or spectral characteristics can be measured.

When the switching device SW is switched to a contact "a" of the input side of the reference voltage of the comparator, the comparison is carried out using the reference voltage Vr.

Then, in the CRT driver 114, a contrast potential voltage is changed so as to reduce the difference signal to 0, and when the corresponding luminance compensation signal is outputted to the drive circuit in the CRT 102, the luminance compensation is carried out. In the green and blue luminance compensation, a frame image for luminance compensation corresponding to each color is successively displayed on the monochromatic CRT 102, and corresponding to this process, measuring color filters 'b' and 'c' are arranged in order by the rotation control of the exposure control section 120. Then, the switching devices are switched to contacts "b" and "c", and the luminance signals are respectively compared with the reference voltages Vg and Vb.

During this luminance compensation, since an optical image in the optical path is completely light-shielded, the optical image is not exposed onto the photographic paper 105.

In this connection, and in this example, only one photometry sensor 101 is used, and measuring color filters 108 are respectively switched for the photometry for each color. Accordingly, as compared with a system in which 3 photometry sensors are arranged respectively corresponding to each measuring color filter 108, dispersion of the photometry value due to the sensors is reduced, so that more accurate measurement can be carried out, and the cost is also reduced.

Further, the light shielding section 107 may be provided at only one portion, so that the size of the rotation disk 106 can be reduced, and photometry can also be carried out while the emitting status continues.

Further, in this example, since each color filter 108 for color measurement is set to have the transmission ratio in which the output level of the photometry sensor 101 is equal to each other, it is not necessary to adjust or switch the amplification factor of the amplifier 111, so that a further reduction in the cost and size of the apparatus can be realized.

Figure 20:
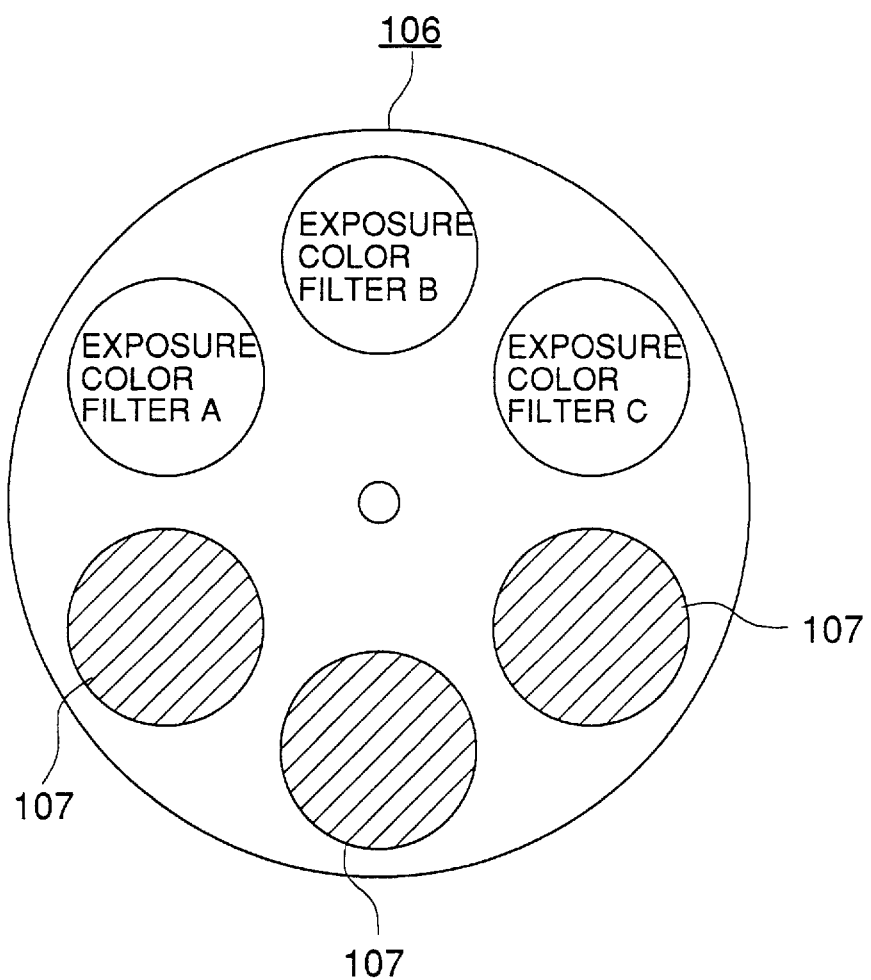
FIG. 20 is a view showing details of the rotation disk in another example by which the fourth object of the present invention is accomplished.

On the other hand, as in the conventional example, the photometry is carried out through the exposure filter 103, and this filter can be commonly used for each color. As shown in FIG. 20, the light shield section 107 and the exposure color filter 103 are provided around the rotation axis, and while 3 light shielding sections 107 successively shield the light, the photometry is carried out through exposure color filters 103. Thereby, each of the measuring color filters 108 is eliminated, resulting in further reduction of cost. The selection of these systems depends on the relationship between the performance and the cost of the exposure apparatus.

Figure 21:
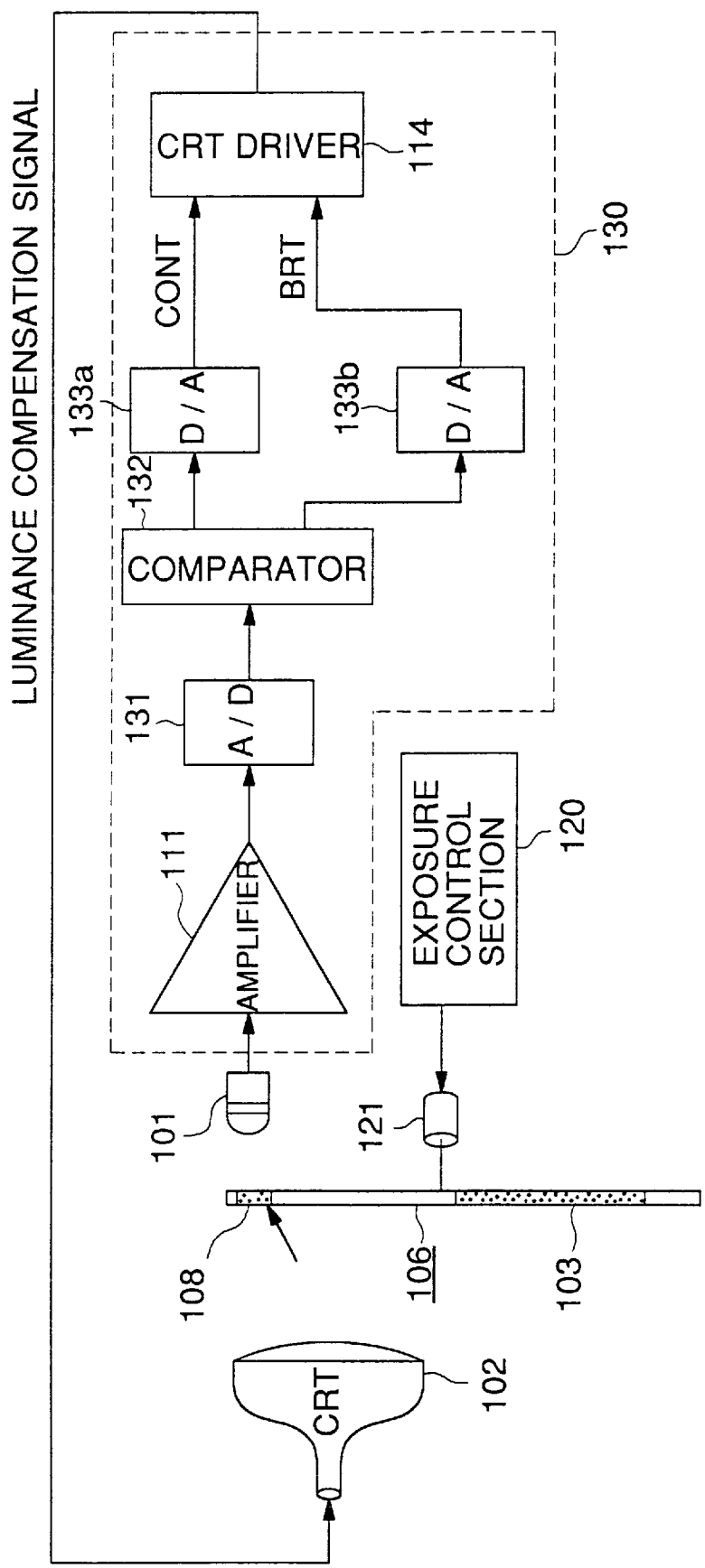
FIG. 21 is a view showing a luminance compensation circuit in another example of the present invention.

FIG. 21 shows the luminance compensation circuit in another example. In this connection, the same numerals are given to the same components as in the previously described examples.

A luminance signal outputted from the photometry sensor 101 is amplified by the amplifier 111, and after that, it is inputted into a mechanical comparator 132, and the amount of the light and spectral characteristics are measured. In the mechanical comparator 132, the reference value corresponding to each color is previously stored, and the inputted luminance signal is computed and processed so that it is equal to the reference value. Then, the processed signal is respectively inputted into D/A converters 133a and 133b as a binarized compensation signal. The D/A converters 133a and 133b then respectively convert the binarized compensation signal into an analog CONT signal, and a BRT signal, and output them to the CRT driver 114. The CRT driver 114 receives these signals, and the contrast potential voltage and the brightness potential voltage are changed. Then, the luminance compensation signal corresponding to these values is outputted to the drive circuit in the monochromatic CRT 102, and thereby, the luminance compensation and the exposure condition compensation such as shutter time control are carried out.

As described in the above two examples, the shutter mechanism is eliminated and photometry can be carried out while the optical image is being light-shielded with respect to the photographic paper 105. Thereby, the structure of apparatus can be simplified, and reduction of cost and the size can be realized.

Next, the exposure stage will be described.

When the luminance compensation is completed, the video signal for each of 3-color separations is inputted into the monochromatic CRT 102, and the frame image for each color is formed. In timed relationship with this process, the exposure control section 120 controls a drive motor 121, and rotates the rotation disk 106 by a predetermined angle. Thereby, a red exposure color filter A, a green exposure color filter B and a blue exposure color filter C are successively switched and arranged. A mono-color image, converted by each exposure color filter 107, is exposed and controlled by the light emitting time control, by which the display on the CRT 102 is ON or OFF at any specified time. The size of the mono-color image is increased or reduced to a required magnification ratio through the lens 104, and the mono-color image is superimposed onto the photographic paper 105 by the additive color method, and is exposed.

Figure 22:
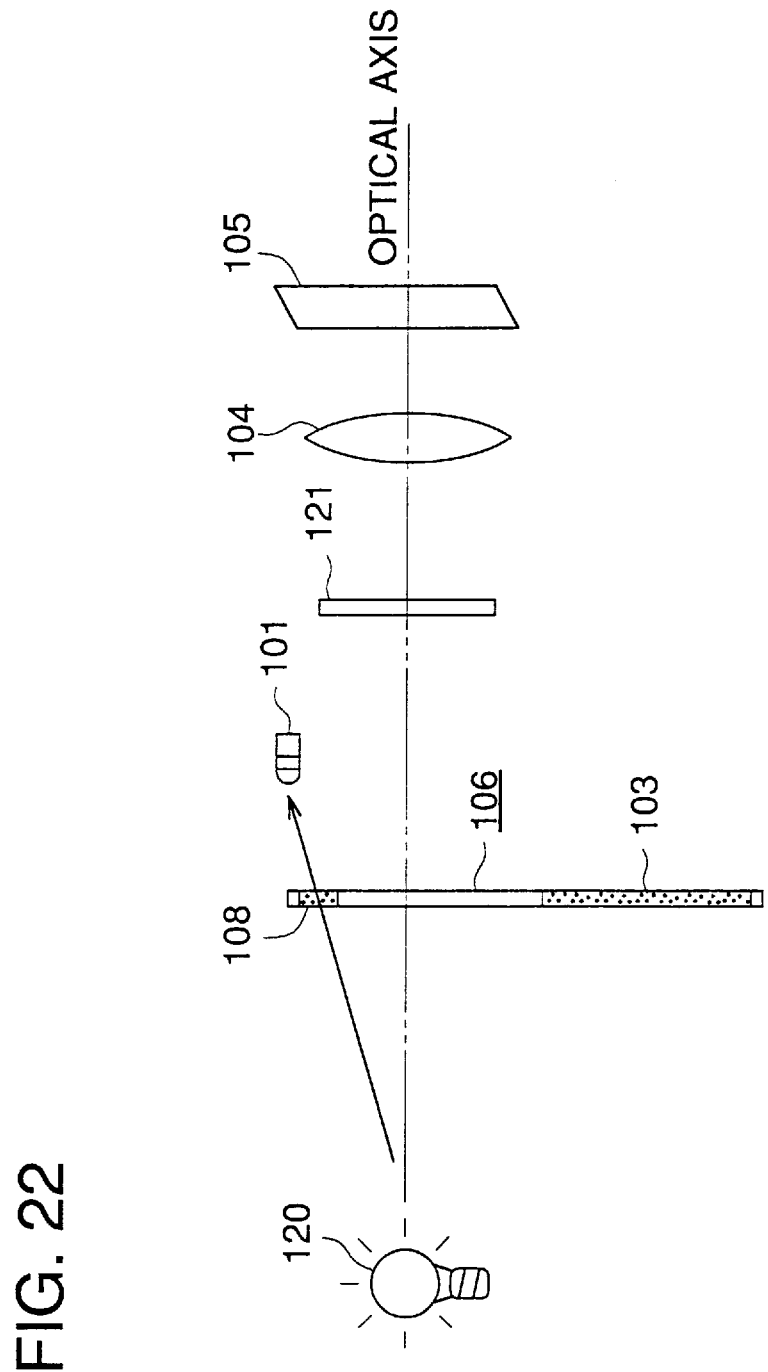
FIG. 22 is a view showing the general structure of an exposure apparatus in another example of the present invention.
Figure 23:
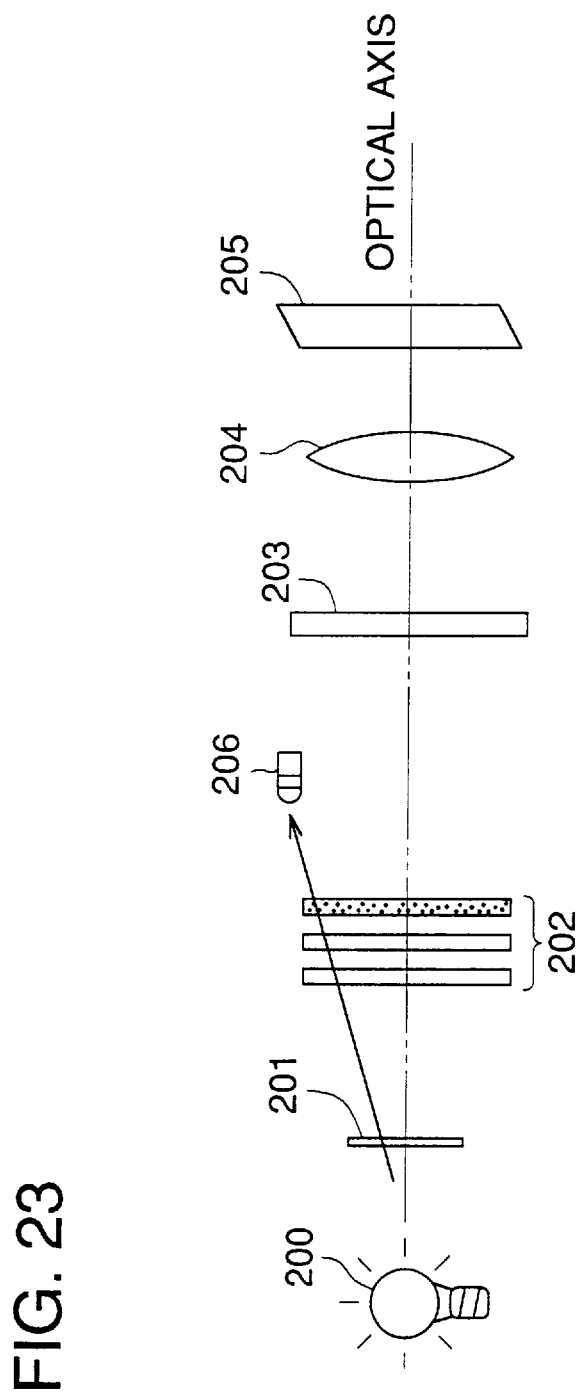
FIG. 23 is a view showing the general structure of an exposure apparatus in a conventional example.
Figure 24:
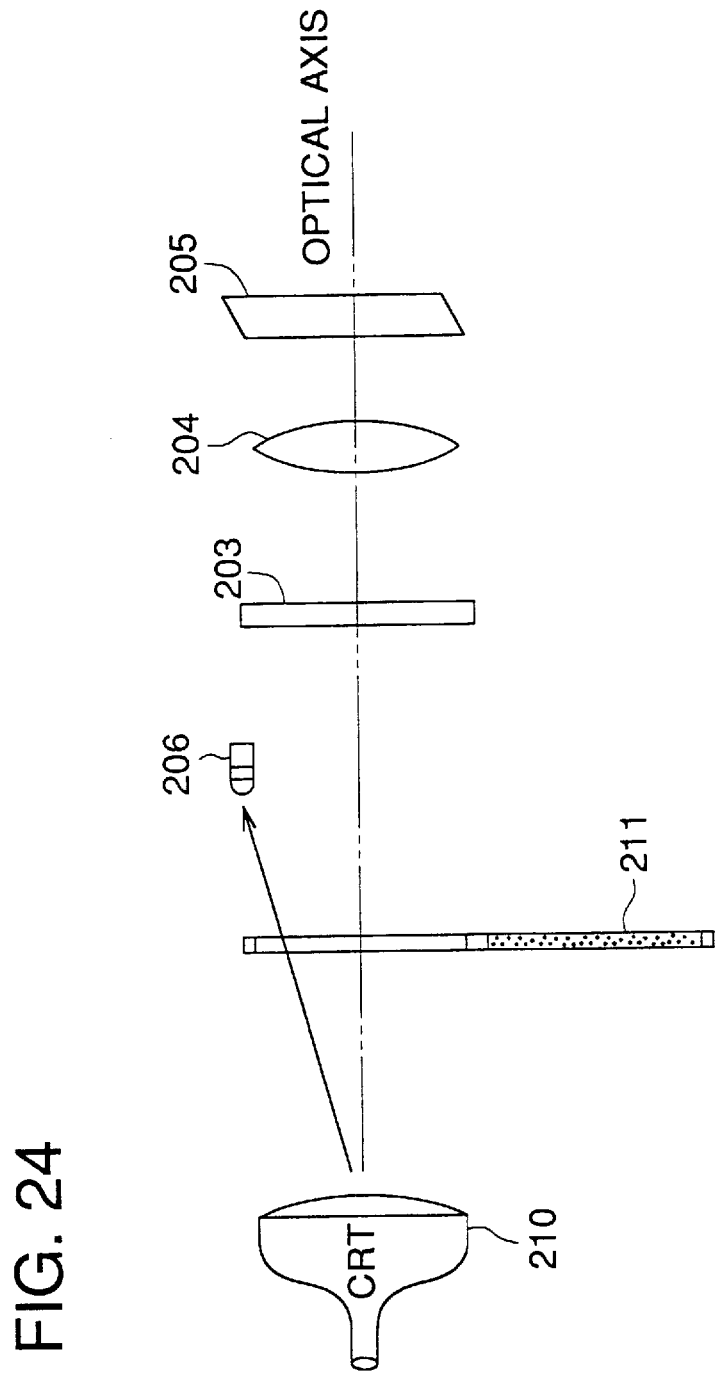
FIG. 24 is a view showing the general structure of an exposure apparatus in a conventional example.

FIG. 22 shows an exposure apparatus using a white light source 120 instead of the monochromatic CRT 102. As described above, when the luminance compensation is completed, each colored light obtained through the exposure color filter 103 passes through a color transmission document (negative film). A mono-color image for each color is enlarged or reduced through the lens 104 to a required magnification ratio, and superimposed onto the photographic paper 105 by the additive color method and exposed.

As described above, according to the present invention, the apparatus has rotation members which are arranged at positions different from each other around the rotation axis such that a light shielding section for shielding the optical path and exposure color filters are selectively located, and an exposure control means drives the rotation members, and controls the exposure in such a manner that the light shielding section and the exposure color filters are selectively located in the optical path. Accordingly, a shutter mechanism can be eliminated, and photometry can be carried out while the optical image is being light-shielded with respect to the recording medium. Thereby, the structure of the apparatus can be simplified, and reduction of cost and size can be realized.

Here, the present invention can also be applied to an exposure apparatus structured such that: the measuring color filter is provided on the rotation member; and the light beam, emitted from the light source for the optical image generation and passed through the measuring color filter, is received by the luminance sensor, in an area in which the rotation member is located at the light shielding position.

Further, in an apparatus in which: the measuring color filter has about the same spectral characteristics as those of the exposure color filter; and the transmission ratio of the measuring color filter is set to the value in which the output value for each color of the luminance sensor is almost equal to each of the others, a structure such as a gain switching mechanism or the like, is not necessary, so that further reduction of cost and size can be realized.

Still further, in an apparatus in which: the exposure color filter is also used for the measuring color filter; and the photometry is conducted through the exposure color filter when the rotation member is located at the light shielding position, both filters can commonly be used for each other, so that a lower cost apparatus can be offered.

Further still, the present invention can also be applied to an exposure apparatus in which: the optical image is expressed by the intensity level for each color separated by the optical image display means; and the optical image is identical to the transmission image of the color transmission document obtained when the white light is transmitted.

Further, the present invention can also be applied to an exposure apparatus in which the exposure condition compensating means controls the contrast potential voltage or the brightness potential voltage of the optical image displaying means by which the optical image is displayed according to the luminance signal sent from the luminance sensor at the time of light shielding.

What is claimed is:

1. An apparatus for recording a color image on a color photographic material based on three color component image signals separated from the color image, comprising:

a black-and-white cathode ray tube for separately and sequentially receiving the three color component image signals and for sequentially emitting a black-and-white image for each of the three color component image signals from a screen;

three color filters, selectively inserted in an optical path between the cathode ray tube and the color photographic material, for converting the black-and-white image into a corresponding monochromatic image for each of the three color component image signals so that the color photographic material is sequentially exposed with three monochromatic images through the optical path in order to record the color image on the color photographic material;

a memory for storing color a reference luminance of each color component corresponding to said three color component image signals;

a detector for detecting a luminance of the light through the respective said color filter for each color component; and luminance control means for comparing the detected luminance with the reference luminance for each color component to obtain a comparison result, and controlling a luminance level of each of the three color component image signals based on the comparison result of each color component so as to control emission of light from the cathode ray tube for each color component based on the reference luminance of each color component.

2. The apparatus of claim 1, wherein the three color components are blue, green and red.

3. The apparatus of claim 1, wherein the cathode ray tube includes a screen which is coated with phosphor in which an amount of phosphor type P45 and phosphor type P22 defined by Electronic Industries Association are mixed with the following ratio:

$$0.67 < P45/P22 < 1.5.$$

4. The apparatus of claim 1, wherein the reference luminance of the color components are determined in accordance with spectral sensitivities of the color photographic material so as to make an exposure time period for each color component equal to that of others.

5. The apparatus of claim 1, wherein the three color filters are used for detecting the luminance of the light for each color component.

6. The apparatus of claim 1, wherein the detector comprises three sensors, each sensor provided with a different color filter for detecting the luminance of the light for each color component.

7. The apparatus of claim 1, wherein the detector is arranged to detect the luminance of the light emitted from a central portion of the screen.

8. The apparatus of claim 1, further comprising a light shielding member capable of being inserted between the cathode ray tube and the color photographic material, wherein a plurality of sensors are placed in a two dimensional arrangement on the light shielding member so that luminance distribution on the cathode ray tube is measured by the plurality of sensors and the luminance distribution on the cathode ray tube is adjusted based on luminance measured by the plurality of sensors.

9. The apparatus of claim 8, wherein the three color filters and the light shielding member are driven by a common driving member.

10. The apparatus of claim 8, wherein the light shielding member is provided between the three color filters and the color photographic material.

11. The apparatus of claim 1, further comprising a rotatable disk on which the three color filters and a light shielding member are provided, wherein the three color filters and the light shielding member are selectively inserted in the optical path with rotation of the disk.

12. The apparatus of claim 11, wherein a color filter for detecting the luminance of light for each color component is provided on the disk in the vicinity of the light shielding member so that the luminance of the light for each color component is detected when the light shielding member shields the optical path.

13. The apparatus of claim 12, wherein the color filter for detecting the luminance has the same spectral characteristics as that of a corresponding one of the three color filters.

* * * * *